US012673350B2

(12) United States Patent
Lee et al.

(10) Patent No.: US 12,673,350 B2
(45) Date of Patent: Jul. 7, 2026

(54) SELF-CLEANING DEVICE AND METHOD USING HEATING, MULTI-VOLTAGE APPLYING OR VIBRATION

(71) Applicant: MICROSYSTEMS, INC., Yongin-si (KR)

(72) Inventors: Kang Yong Lee, Yongin-si (KR); Jeong Min Lee, Yongin-si (KR); Dae Young Lee, Yongin-si (KR); Dae Geun Kim, Yongin-si (KR); Young Gwang Kim, Boeun-gun (KR); Jae Hun Shin, Yongin-si (KR)

(73) Assignee: MICROSYSTEMS, INC., Yongin-si (KR)

( * ) Notice: Subject to any disclaimer, the term of this patent is extended or adjusted under 35 U.S.C. 154(b) by 92 days.

(21) Appl. No.: 18/640,184

(22) Filed: Apr. 19, 2024

(65) Prior Publication Data

US 2024/0261828 A1     Aug. 8, 2024

Related U.S. Application Data

(63) Continuation of application No. PCT/KR2022/015956, filed on Oct. 19, 2022.

(30) Foreign Application Priority Data

| | | |
|---|---|---|
| Oct. 20, 2021 | (KR) | 10-2021-0140094 |
| Oct. 20, 2021 | (KR) | 10-2021-0140095 |

(Continued)

(51) Int. Cl.
| | |
|---|---|
| *B08B 7/00* | (2006.01) |
| *B08B 7/02* | (2006.01) |

(Continued)

(52) U.S. Cl.
CPC .............. *B08B 7/0071* (2013.01); *B08B 7/02* (2013.01); *B08B 7/04* (2013.01); *F26B 3/28* (2013.01);
(Continued)

(58) Field of Classification Search
CPC . C08J 7/04; G03B 17/55; G03B 17/12; C03C 17/36; G02B 27/0006; H05B 3/84;
(Continued)

(56) References Cited

U.S. PATENT DOCUMENTS

| | | | |
|---|---|---|---|
| 10,035,498 B2 * | 7/2018 | Richardson | .............. B08B 3/02 |
| 10,695,805 B2 * | 6/2020 | Magee | ................. G01N 29/348 |

(Continued)

FOREIGN PATENT DOCUMENTS

| | | |
|---|---|---|
| JP | 02197454 A | 8/1990 |
| KR | 10-2011-0094681 A | 8/2011 |

(Continued)

OTHER PUBLICATIONS

International Search Report of PCT/KR2022/015956, dated Feb. 14, 2023.
(Continued)

*Primary Examiner* — Benjamin L Osterhout

(57) ABSTRACT

A self-cleaning device and a method of operating the same for removing droplet, high viscosity liquid material or mixed material using heating, multi-voltage applying or vibration are disclosed. The self-cleaning device comprises a metal material layer disposed on a solid material layer and a hydrophobic layer disposed on the metal material layer. The metal material layer includes a view member formed of conductive material and a heating member disposed outside or inside the view member, heat is generated from the view member and the heating member when a power is applied to the view member and the heating member, the heat gener- (Continued)

ated from the heating member is delivered to the view member, and droplet existed on a surface of the self-cleaning device is removed or a volume or surface tension of the droplet reduces by the heat generated from the view member and the heat delivered from the heating member.

26 Claims, 16 Drawing Sheets

(30)      Foreign Application Priority Data

| | | |
|---|---|---|
| Jan. 18, 2022 | (KR) | 10-2022-0007073 |
| Mar. 25, 2022 | (KR) | 10-2022-0037099 |
| Mar. 25, 2022 | (KR) | 10-2022-0037100 |
| Oct. 18, 2022 | (KR) | 10-2022-0133794 |

(51)    Int. Cl.

| | |
|---|---|
| *B08B 7/04* | (2006.01) |
| *B60S 1/56* | (2006.01) |
| *F26B 3/28* | (2006.01) |
| *F26B 7/00* | (2006.01) |
| *G02B 27/00* | (2006.01) |
| *H05B 3/84* | (2006.01) |
| *C03C 17/36* | (2006.01) |
| *C08J 7/04* | (2020.01) |
| *F26B 3/20* | (2006.01) |
| *G03B 17/12* | (2021.01) |
| *G03B 17/55* | (2021.01) |
| *H05B 3/12* | (2006.01) |

(52)    U.S. Cl.
CPC ............ *F26B 7/00* (2013.01); *G02B 27/0006* (2013.01); *H05B 3/84* (2013.01); *B08B 7/00* (2013.01); *B60S 1/56* (2013.01); *C03C 17/36* (2013.01); *C08J 7/04* (2013.01); *F26B 3/20* (2013.01); *G03B 17/12* (2013.01); *G03B 17/55* (2013.01); *H05B 3/12* (2013.01)

(58)    Field of Classification Search
CPC .... H05B 3/12; B08B 7/00; B08B 7/02; B08B 7/0071; B08B 7/04; F26B 7/00; F26B 3/20; F26B 3/28; B60S 1/56
See application file for complete search history.

(56)      References Cited

U.S. PATENT DOCUMENTS

| | | | | |
|---|---|---|---|---|
| 10,696,277 | B1 * | 6/2020 | Rakouki | B60S 1/56 |
| 10,908,414 | B2 * | 2/2021 | Revier | G01H 13/00 |
| 11,042,026 | B2 * | 6/2021 | Fedigan | B08B 3/12 |
| 11,420,238 | B2 * | 8/2022 | Magee | B60S 1/56 |
| 2012/0243093 | A1 * | 9/2012 | Tonar | H10N 30/20 |
| | | | | 359/507 |
| 2015/0029340 | A1 * | 1/2015 | Taguchi | H04N 7/183 |
| | | | | 348/151 |
| 2018/0113297 | A1 | 4/2018 | Desai et al. | |
| 2018/0221921 | A1 * | 8/2018 | Magee | G01N 29/022 |
| 2018/0243804 | A1 * | 8/2018 | Magee | B08B 7/028 |
| 2018/0326462 | A1 * | 11/2018 | Revier | B08B 7/028 |
| 2020/0282435 | A1 * | 9/2020 | Magee | G02B 27/0006 |

FOREIGN PATENT DOCUMENTS

| | | | | | |
|---|---|---|---|---|---|
| KR | 20150041409 | A | | 4/2015 | |
| KR | 20150130105 | A | | 11/2015 | |
| KR | 101684158 | B1 | | 12/2016 | |
| KR | 10-2020-0001840 | A | | 1/2020 | |
| KR | 20200001840 | A | | 1/2020 | |
| KR | 102152644 | B1 | | 9/2020 | |
| KR | 10-2021-0057899 | A | | 5/2021 | |
| WO | WO-2020158938 | A1 * | 8/2020 | | H04N 23/811 |
| WO | WO-2021096055 | A1 * | 5/2021 | | B08B 7/02 |
| WO | WO-2021210927 | A1 * | 10/2021 | | B60S 1/026 |

OTHER PUBLICATIONS

Written Opinion of the International Searching Authority of PCT/KR2022/015956, dated Feb. 14, 2023.

* cited by examiner

SELF-CLEANING DEVICE AND METHOD USING HEATING, MULTI-VOLTAGE APPLYING OR VIBRATION

CROSS-REFERENCE TO RELATED APPLICATIONS

This application is a Bypass continuation of pending PCT International Application No. PCT/KR2022/015956, which was filed on Oct. 19, 2022, and which claims priorities under 35 U.S.C 119(a) to Korean Patent Application No. 10-2021-0140094 filed with the Korean Intellectual Property Office on Oct. 20, 2021, Korean Patent Application No. 10-2021-0140095 filed with the Korean Intellectual Property Office on Oct. 20, 2021, Korean Patent Application No. 10-2022-0007073 filed with the Korean Intellectual Property Office on Jan. 18, 2022, Korean Patent Application No. 10-2022-0037099 filed with the Korean Intellectual Property Office on Mar. 25, 2022, Korean Patent Application No. 10-2022-0037100 filed with the Korean Intellectual Property Office on Mar. 25, 2022 and Korean Patent Application No. 10-2022-0133794 filed with the Korean Intellectual Property Office on Oct. 18, 2022. The disclosures of the above patent applications are incorporated herein by reference in their entirety.

TECHNICAL FIELD

The disclosure relates to a self-cleaning apparatus and a method of operating the same for removing droplet, high viscosity liquid material or a mixed material using heating, multi-voltage applying or vibration.

BACKGROUND ART

A glass has been necessarily used in an industrial equipment, e.g., a vehicle, a crane or a construction equipment in which user's view should be continuously secured because it has excellent optical feature. However, contaminant such as rainwater or dust is easily adhered to a surface of the glass of the industrial equipment used in various industrial fields, and thus user's visibility becomes lower. As a result, this causes inconvenience and severe safety accident.

Mechanical wiper developed over 100 years ago has been used for cleaning contaminant on industrial equipment. However, the mechanical wiper hinders driver's view because it moves repeatedly. Additionally, an area cleaned by the mechanical wiper is limited and cleaning efficiency is very low.

Visibility of a camera becomes lower when droplets such as rainwater, etc. are adhered to a surface of the camera.

To solve this problem, a cleaning technique for removing droplets by setting a wiper to the camera has been developed. However, the cleaning technique requires a driving motor, etc., and thus a size of a cleaning device increases and the cleaning device becomes complicated. Furthermore, durability of a part such as the driving motor, etc. is low. Accordingly, it is difficult to apply the cleaning technique to a miniature camera and various cameras.

SUMMARY

The disclosure is to provide a self-cleaning device and a method of operating the same for removing droplet, high viscosity liquid material or mixed material using heating, multi-voltage applying or vibration.

A self-cleaning device according to an embodiment of the disclosure comprises a metal material layer disposed on a solid material layer; and a hydrophobic layer disposed on the metal material layer. Here, the metal material layer includes a view member formed of conductive material and a heating member disposed outside or inside the view member, heat is generated from the view member and the heating member when a power is applied to the view member and the heating member, the heat generated from the heating member is delivered to the view member, and droplet existed on a surface of the self-cleaning device is removed or a volume or surface tension of the droplet reduces by the heat generated from the view member and the heat delivered from the heating member.

A self-cleaning device according to another embodiment of the disclosure includes a metal material layer disposed on a solid material layer; and a hydrophobic layer disposed on the metal material layer. Here, the metal material layer includes a view member formed of conductive material and a heating member disposed outside or inside the view member, the view member includes at least one first sub view member and one or more second sub view members disconnected electrically each other, the first sub view member and the second sub view member are disposed in turns, the view member is electrically separated from the heating member, change of resistance or capacitance of the self-cleaning device occurred according as a first power is applied to the first sub view member and a second power is applied to the second sub view member is sensed, it is discriminated through the sensed result whether droplet exists on a surface of the self-cleaning device, and the droplet existed on the surface of the self-cleaning device is removed or a volume or surface tension of the droplet reduces by heat generated from the metal material layer when it is discriminated that the droplet exists.

A self-cleaning device according to still another embodiment of the disclosure includes a solid material layer; a metal material layer disposed on the solid material layer; and a hydrophobic layer disposed on the metal material layer. Here, heat is generated from the metal material layer when a power is applied to the metal material layer and droplet existed on a surface of the self-cleaning device is removed or a volume or surface tension of the droplet reduces by the generated heat, and a second voltage smaller than a first voltage is applied to the metal material layer when specific reference is satisfied after the first voltage is applied to the metal material layer.

A self-cleaning device according to still another embodiment of the disclosure includes an insulation layer disposed on a solid material layer; an electrode layer disposed on the insulation layer; and a hydrophobic layer disposed on the electrode layer. Here, heat is generated from the electrode layer when an electrical signal is provided to the electrode layer, a volume or surface tension of droplet existed on the hydrophobic layer reduces by the generated heat, and the insulation layer prevents the heat generated from the electrode layer from being delivered in a direction of the solid material layer.

A self-cleaning device according to still another embodiment of the disclosure includes a heating member disposed on a solid material layer; a hydrophobic layer disposed on the heating member; and a mechanical vibration unit disposed below the solid material layer and configured to generate single frequency sound or multi-frequency sound. Here, a viscosity of high viscosity liquid contaminant on the hydrophobic layer reduces by heat generated from the heating member, the high viscosity liquid contaminant of which the viscosity reduces is atomized by mechanical vibration generated by the mechanical vibration unit, and the high viscosity liquid contaminant has the viscosity of above 10 cP.

A self-cleaning device according to still another embodiment of the disclosure includes a heating layer disposed on a solid material layer; a hydrophobic layer disposed on the heating layer; and a mechanical vibration unit disposed below the solid material layer and configured to generate single frequency sound or multi-frequency sound. Here, liquid contaminant of a mixed contaminant including solid contaminant and the solid contaminant existed on the hydrophobic layer is evaporated by heat generated from the heating layer, and the solid contaminant of the mixed contaminant is separated from a surface of the self-cleaning device by mechanical vibration generated from the mechanical vibration unit after the heat is generated to being removed.

A self-cleaning device and a method of operating the same according to an embodiment of the disclosure may be used to a glass of an industrial equipment such as a camera, a vehicle or a construction equipment, etc., and remove droplets adhered to a surface of the self-cleaning device using heat generated by applying a power to an electrode layer.

Especially, patterned electrode is disposed on a location corresponding to a lens of the camera and a heating member on which conductive material is coated is disposed outside the pattern electrode, heat generated from the heating member may be delivered to the patterned electrode. As a result, droplets adhered to the surface of the self-cleaning device may be better removed.

Additionally, transparent patterned electrode is disposed on the location corresponding to the lens of the camera, and thus visibility of the camera is not a marked decline. That is, the self-cleaning device may remove efficiently the droplets existed on the surface of the camera with securing the visibility of the camera.

Furthermore, the self-cleaning device may increase up to target temperature by applying relative high voltage to an electrode layer and keep the target temperature by applying relative low voltage to the electrode layer when the self-cleaning device reaches the target temperature. As a result, heating speed may be enhanced.

Moreover, the self-cleaning device may remove droplet, high viscosity liquid contaminant and mixed contaminant of liquid and solid by using electric resistance heat and mechanical vibration. Especially, the heat generated from the electrode layer is not delivered to a mechanical vibration unit for generating mechanical vibration by disposing an insulation layer between the electrode layer and a solid material layer, and so performance of the mechanical vibration unit may not be deteriorated.

BRIEF DESCRIPTION OF DRAWINGS

Example embodiments of the disclosure will become more apparent by describing in detail example embodiments of the disclosure with reference to the accompanying drawings, in which:

FIG. 19 to FIG. 26 are views illustrating a process of removing droplets, high viscosity liquid contaminant and mixed contaminant using the self-cleaning device in FIG. 16 or FIG. 17.

DETAILED DESCRIPTION

In the present specification, an expression used in the singular encompasses the expression of the plural, unless it has a clearly different meaning in the context. In the present specification, terms such as "comprising" or "including," etc., should not be interpreted as meaning that all of the elements or operations are necessarily included. That is, some of the elements or operations may not be included, while other additional elements or operations may be further included. Also, terms such as "member," "module," etc., as used in the present specification may refer to a part for processing at least one function or action and may be implemented as hardware, software, or a combination of hardware and software.

The disclosure related to a self-cleaning device and a method of operating the same and may remove droplets such as water or frost, etc. existed on a surface of a camera or an industrial glass by evaporating the droplets using heating. As a result, the self-cleaning device may remove efficiently the droplets without extra driving device and it is possible to miniaturize the self-cleaning device.

In another embodiment, the self-cleaning device may improve heating speed by applying initially relative high voltage.

In still another embodiment, the self-cleaning device may remove droplets, high viscosity liquid contaminant and mixed contaminant of liquid and solid by using electric resistance heat and mechanical vibration.

Here, the self-cleaning device may be a single device or a device combined with another device. For example, the self-cleaning device may be used to a device including an outer glass, e.g., a camera of a vehicle, a digital camera, a mobile camera or an image sensor of Internet of Things and so on.

For another example, the self-cleaning device may be used to an industrial glass or a windshield of a vehicle. Of course, the self-cleaning device is not limited as long as it removes the droplets and may be variously modified.

Hereinafter, embodiments of the disclosure will be described in detail with reference to accompanying drawings.

Figure 1:
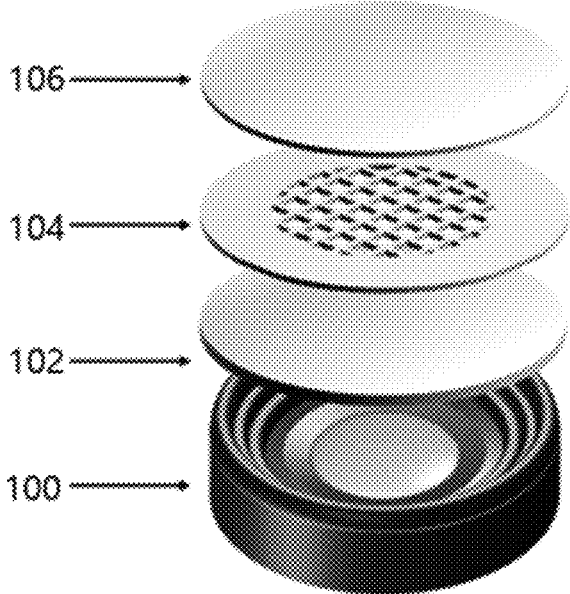
FIG. 1 is a perspective view illustrating schematically a self-cleaning device according to an embodiment of the disclosure.
Figure 2:
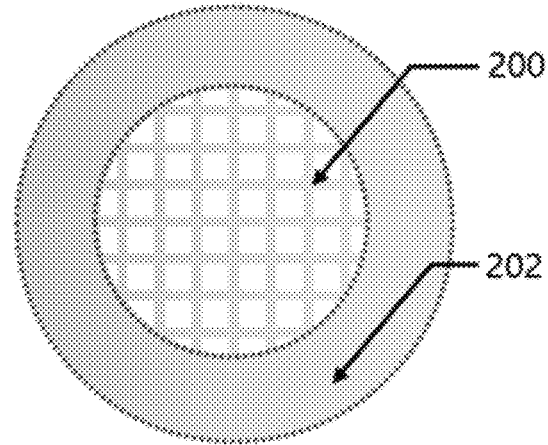
FIG. 2 is a view illustrating an electrode layer according to an embodiment of the disclosure.
Figure 3:
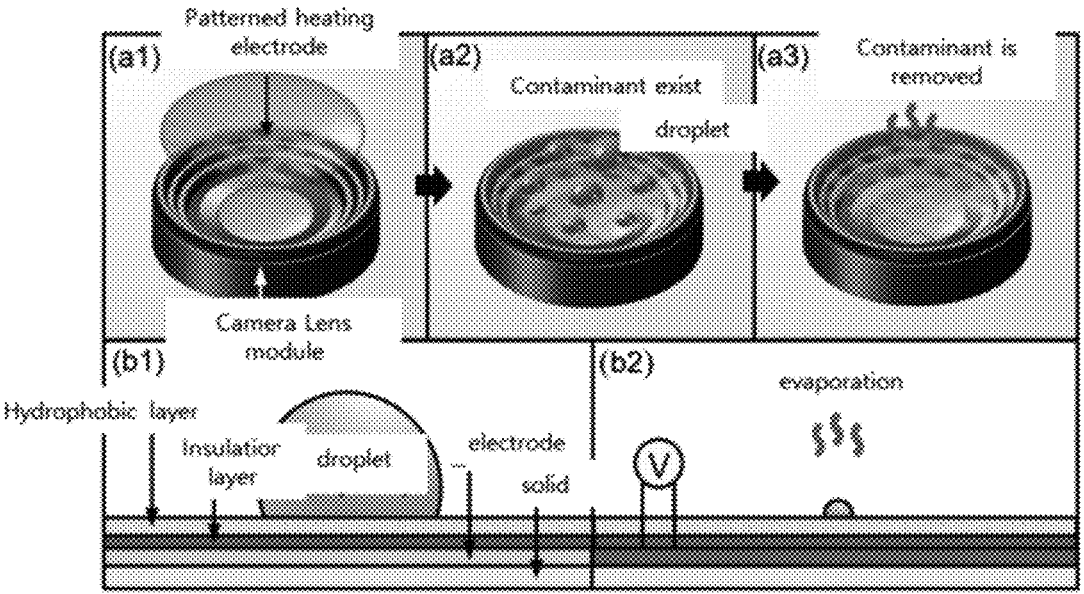
FIG. 3 and FIG. 4 are views illustrating a process of removing droplets using the self-cleaning device in FIG. 1.
Figure 4:
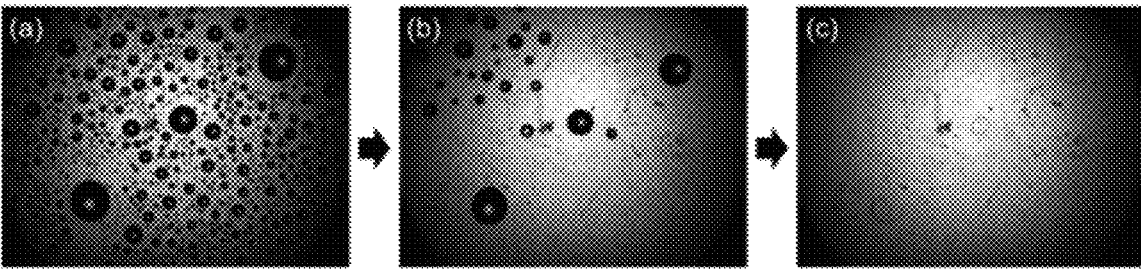

FIG. 1 is a perspective view illustrating schematically a self-cleaning device according to an embodiment of the disclosure, FIG. 2 is a view illustrating an electrode layer according to an embodiment of the disclosure, and FIG. 3 and FIG. 4 are views illustrating a process of removing droplets using the self-cleaning device in FIG. 1.

In FIG. 1, the self-cleaning device of the present embodiment is used to a camera such as CCTV, etc. and may include a solid material layer 102, an electrode layer 104 and a hydrophobic insulation layer 106 disposed sequentially on a lens module 100 of the camera.

The solid material layer 102 is a basic layer disposed on the lens module 100 of the camera.

The electrode layer (metal material layer or heating layer) 104 is disposed on the solid material layer 102 and may generate heat depending on Joule's law when a power is applied thereto from an outer device. Accordingly, the electrode layer 104 may evaporate droplets existed on the hydrophobic insulation layer 106 by generating heat, thereby removing the droplets.

Droplets of specific size, e.g., a size higher than 3 $\mu\ell$ are slipped in a gravitational direction by hydrophobic feature of the hydrophobic insulation layer 106 because a surface of the camera is inclined, thereby removing the droplets. Droplets of e.g., a size less than 3 $\mu\ell$ may be removed by using heating of the electrode layer 104. The droplet of less than 3 $\mu\ell$ is small droplet, and thus the droplets of less than 3 $\mu\ell$ are not well slipped in the gravitational direction. As a result, the droplets of less than 3 $\mu\ell$ are not easily removed by using only hydrophobic feature. Accordingly, the self-cleaning device of the disclosure may evaporate the droplets of less than 3 $\mu\ell$ by generating the heat, thereby removing the droplets.

In an embodiment, the electrode layer 104 may include a lens member (pattern member or view member) 200 and a heating member 202 as shown in FIG. 2 and be realized with thin thickness of less than 1 μm.

The lens member 200 may be disposed at a location corresponding to a lens of the camera, i.e., a central part of the electrode layer 104. This lens member 200 may be formed at the location corresponding to the lens of the camera, and thus image quality of the camera may be deteriorated if the lens member 200 is opaque. Accordingly, the lens member 200 may be formed of transparent material so that a light passes well through the lens member 200 and be embodied with a patterned structure, e.g., a mesh structure. As a result, the lens member 200 may have excellent transmittance with generating heat.

The heating member 202 may be electrically connected to the lens member 200 while it locates outside the lens member 200, and conductive material may be coated on whole area of the heating member 202 as shown in FIG. 2.

Preferably, the heating member 202 may be formed of material with excellent heating efficiency and locate at a position not corresponding to the lens of the camera.

Heat is generated from the heating member 202 when a power is applied to the heating member 202, and the generated heat may be delivered to the lens member 200. As a result, droplet evaporation efficiency of the lens member 200 may be enhanced. Of course, a power may be applied to the lens member 200. That is, the powers, e.g., direct current (DC) may be applied to the lens member 200 and the heating member 202, respectively.

The lens member 200 and the heating member 202 may be formed of the same conductive material or different conductive material.

In an embodiment, each of the lens member 200 and the heating member 202 may be formed of metal, metallic oxides, carbon material, polymer material or their mixture.

Silver, copper, aluminum or nickel, etc. may be used as the metal, ITO, FTO, AZO or ZnO, etc. may be used as the metallic oxides, and Carbon Nano Tube (CNT), carbon nanofiber, graphene, etc. may be used as the carbon material.

The lens member 200 may be partially patterned, and thus it has excellent transmittance compared to the heating member 202 of which conductive material is coated on the whole area but its heating amount per unit area is lower than that of the heating member 202 because the unit area of the lens member 200 is small. Reduction of droplet removal efficiency of the lens member 200 may be compensated by the heat delivered from the heating member 202.

The hydrophobic insulation layer 106 is disposed on the electrode layer 104 and may include for example an insulation layer and a hydrophobic layer. That is, the insulation layer and the hydrophobic layer may be sequentially disposed on the electrode layer 104, and droplets exist on the hydrophobic layer.

Briefly, the self-cleaning device of the present embodiment may remove the droplets by generating the heat using the electrode layer 104 as shown in a1 to a3 in FIG. 3. Particularly, the self-cleaning device may remove the droplets of a size higher than 3 $\mu\ell$ by slipping the droplets in gravitational direction as shown in b1 in FIG. 3, and remove the droplets of less than 3 $\mu\ell$ by evaporating the droplets using the heat as shown in b2 in FIG. 3. Experimental result of this removing of the droplets is shown in FIG. 4.

On the other hand, in the self-cleaning device, the heating member may locate inside the pattern member according to its kind.

In above description, the conductive material is coated on the whole area of the heating member. However, conductive material may not be coated on a part of the heating member.

Figure 5:
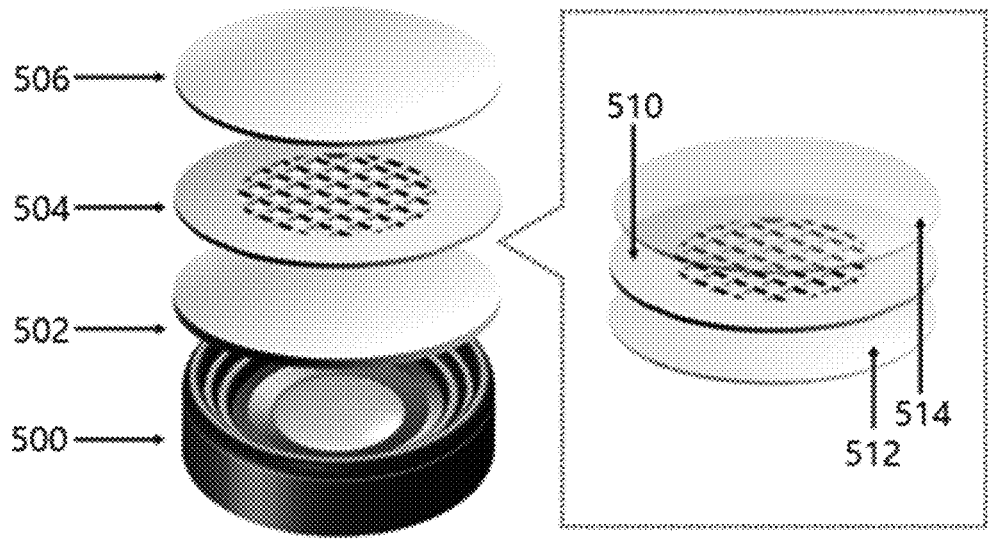
FIG. 5 is a perspective view illustrating a self-cleaning device according to another embodiment of the disclosure.

FIG. 5 is a perspective view illustrating a self-cleaning device according to another embodiment of the disclosure.

In FIG. 5, the self-cleaning device of the present embodiment may include a solid material layer 502, a multi-electrode layer 504 and a hydrophobic insulation layer 506 disposed sequentially on a lens module 500 of a camera. That is, the other elements except the multi-electrode layer 504 are the same as in elements in FIG. 1.

The multi-electrode layer 504 may include a metal material layer 510, a first conductive material layer 512 disposed below the metal material layer 510 and a second conductive material layer 514 disposed on the metal material layer 510. That is, the multi-electrode layer 504 may include multiple electrode layers.

The metal material layer 510 may have the same structure as the electrode layer 104 in FIG. 1. That is, patterned structure may be formed at a central part of the metal material layer 510 and conductive material may be coated on the whole area of an outer part of the metal material layer 510.

The first conductive material layer 512 is electrically connected to the metal material layer 510 while it is disposed below the metal material layer 510.

The second conductive material layer 514 is electrically connected to the metal material layer 510 while it is disposed on the metal material layer 510.

Especially, conductive material is coated on whole area of the conductive material layers 512 and 514, and thus the conductive material layers 512 and 514 should have excellent transmittance. For example, the conductive material layers 512 and 514 may be formed of metallic oxides such as ITO, etc. Whereas, the metal material layer 510 is patterned at its central part and thus its transmittance is secured. Accordingly, it is efficient to form the metal material layer 510 with material having excellent heating feature.

Of course, the metal material layer 510 and the conductive material layers 512 and 514 may be formed of the same material which has excellent transmittance and heating feature.

In an embodiment, a power, e.g., DC may be applied to the metal material layer 510 and a power may not be applied to the conductive material layers 512 and 514. In this case, since the metal material layer 510 is electrically connected to the conductive material layers 512 and 514, much heat generated from an outer area of the metal material layer 510 may be delivered to a pattern member through the conductive material layers 512 and 514, and thus removal efficiency of droplet may be enhanced. That is, the conductive material layers 512 and 514 don't generate heat but deliver the heat.

In another embodiment, to increase the removal efficiency of the droplet, a power, e.g., DC may be applied to one or more of the conductive material layers 512 and 514 as well as the metal material layer 510. In this case, the self-cleaning device becomes complicated.

Shortly, the self-cleaning device of the present embodiment may enhance the removal efficiency of the droplet by disposing the conductive material layers 512 and 514 for delivering the heat on and below the metal material layer 510.

The conductive material layers 512 and 514 are disposed on and below the metal material layer 510 in above description, but only one conductive material layer may locate on the metal material layer 510.

In another embodiment, patterned structure may be formed at a central part of the conductive material layer 512 or 514 as well as the metal material layer 510.

In still another embodiment, the conductive material layer 512 or 514 may cover only patterned central part not whole area of the metal material layer 510. In this case, a size of the conductive material layer 512 or 514 is smaller than that of the metal material layer 510.

In still another embodiment, the conductive material layer 512 or 514 is not electrically to the metal material layer 510. In this case, efficiency of heat generated from the heating member is low, but it is possible to deliver the heat generated from the heating member to the pattern member through the conductive material layer 512 or 514.

Figure 6:
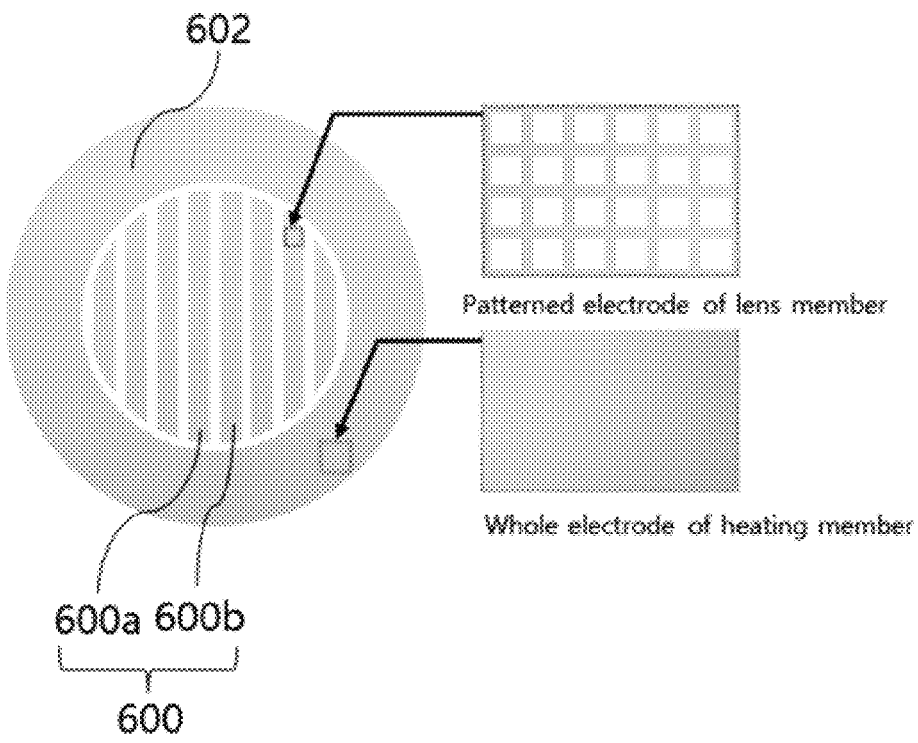
FIG. 6 is a view illustrating an electrode layer of a self-cleaning device according to still another embodiment of the disclosure.
Figure 7:
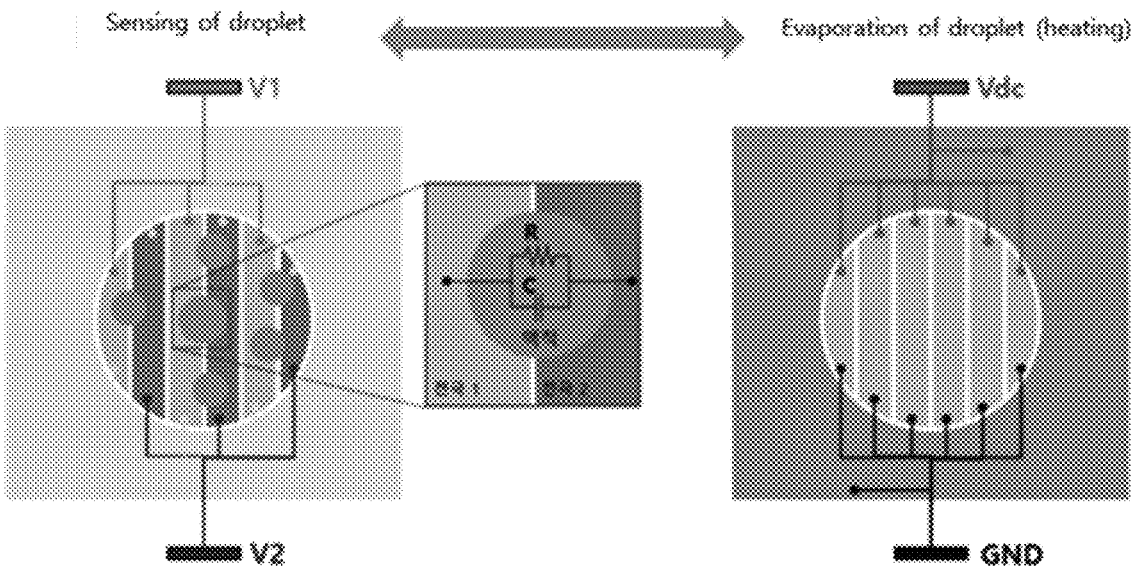
FIG. 7 is a view illustrating a process of sensing and removing droplets according to an embodiment of the disclosure.

FIG. 6 is a view illustrating an electrode layer of a self-cleaning device according to still another embodiment of the disclosure, and FIG. 7 is a view illustrating a process of sensing and removing droplets according to an embodiment of the disclosure.

In FIG. 6, an electrode layer (metal material layer or heating layer) of a self-cleaning device of the present embodiment may include a lens member 600 and a heating member 602.

The lens member (pattern member) 600 may be formed at a central part corresponding to a lens of a camera and include a first sub lens member (first sub pattern member) 600a and a second sub lens member (second sub pattern member) 600b disconnected electrically each other. Particularly, the first sub lens members 600a and the second sub lens members 600b may be disposed in turns as shown in FIG. 6.

Here, each of the sub lens members 600a and 600b may include small pattern electrodes having for example a rectangular shape to sense small droplets as shown in FIG. 6.

The heating member 602 may locate outside of the lens member 600 and be electrically separated from the lens member 600.

Conductive material may be coated on whole area of the heating member 602. Of course, the conductive material may not be coated on a part of the heating member 602.

A process of sensing and removing droplets using the electrode layer will be described in detail with reference to accompanying drawing FIG. 7.

In a process of sensing the droplets, a first power, e.g., first alternating current voltage may be applied to the first sub lens members 600a and a second power, e.g., second alternating current voltage may be applied to the second sub lens members 600b.

Here, the first sub lens member 600a and the second sub lens member 600b may be electrically separated, and a dielectric may locate physically between adjacent sub lens members 600a and 600b. As a result, adjacent sub lens member 600a and 600b may form a capacitor, they being a resistor in itself. That is, the self-cleaning device may measure change of resistance or capacitance using the sub lens members 600a and 600b. The self-cleaning device may further include a droplet sensing unit (not shown) and a controller (not shown) for measuring and analyzing the change.

Resistance or capacitance of the self-cleaning device is varied when droplets exist on a surface of the self-cleaning device, and the droplet sensing unit may sense change of resistance or capacitance of the self-cleaning device using the sub lens members 600a and 600b. That is, the droplet sensing unit may discriminate whether the droplet exists on the surface of the self-cleaning device by sensing the change of resistance or capacitance of the self-cleaning device.

The controller may generate heat by applying respectively the powers, e.g., direct current voltage to the sub lens members 600a and 600b and the heating member 602 to remove the droplets when it is discriminated that the droplets exist on the surface of the self-cleaning device. In this time, the sub lens members 600a and 600b and a power unit (not shown) form a closed circuit. In this case, the same direct current voltage may be applied to the sub lens members 600a and 600b. Additionally, the same direct current voltage may be applied to the heating member 602.

Of course, different direct current voltages may be applied to one or more of the sub lens members 600a and 600b and the heating member 602.

Briefly, the self-cleaning device of the present embodiment disposes alternatively the sub lens members 600a and 600b and separates electrically the sub lens members 600a and 600b, thereby realizing the sensing and the removing of the droplets.

In another embodiment, thin first insulation layer and first conductive material layer may be sequentially disposed below a metal material layer, and thin second insulation layer and second conductive material layer may locate sequentially on the metal material layer. Here, the conductive material layers may not be electrically connected to the metal material layer. In this case, efficiency of heat generated from the heating member 602 of the metal material layer is low, but the heat may be delivered to the pattern member 600 through the conductive material layers.

On the other hand, the self-cleaning device is used for the camera in above description, but it may be applied to various applications such as a glass of a vehicle, etc.

Figure 8:
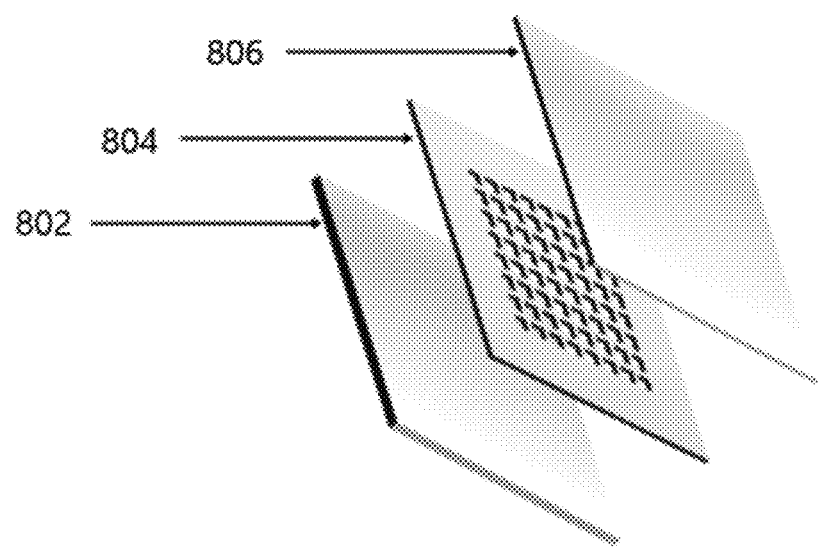
FIG. 8 is a perspective view illustrating schematically a self-cleaning device according to still another embodiment of the disclosure.
Figure 9:
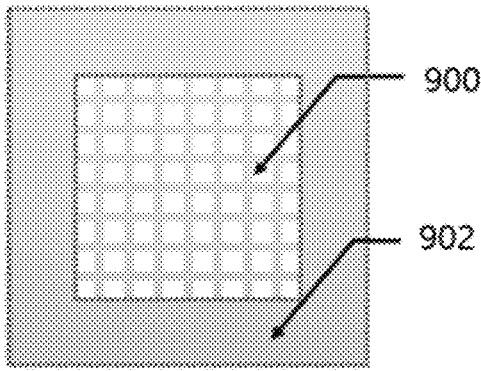
FIG. 9 is a view illustrating an electrode layer according to still another embodiment of the disclosure.
Figure 10:
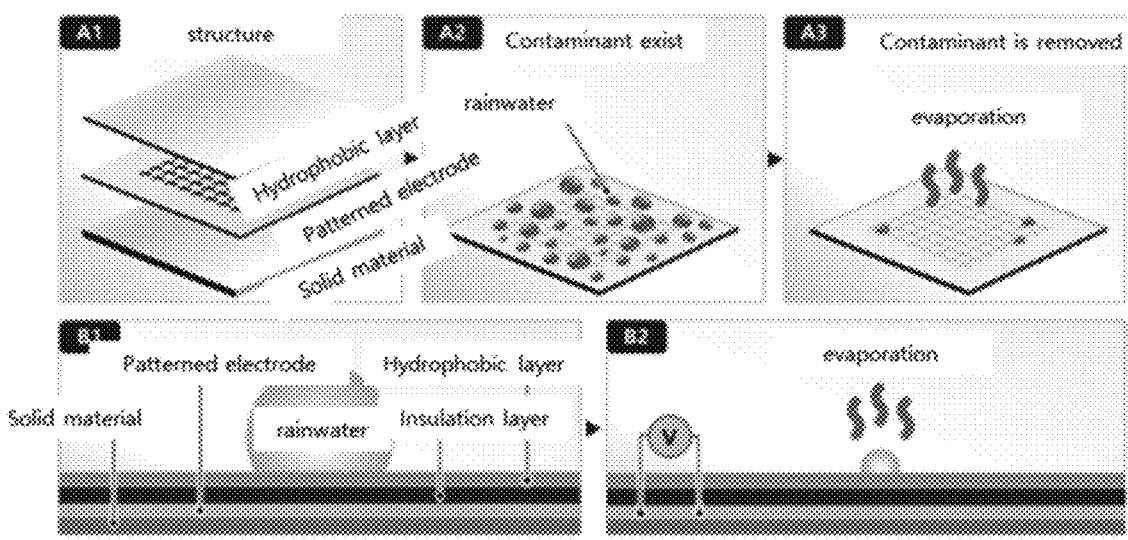
FIG. 10 and FIG. 11 are views illustrating a process of removing droplets using the self-cleaning device in FIG. 8.
Figure 11:
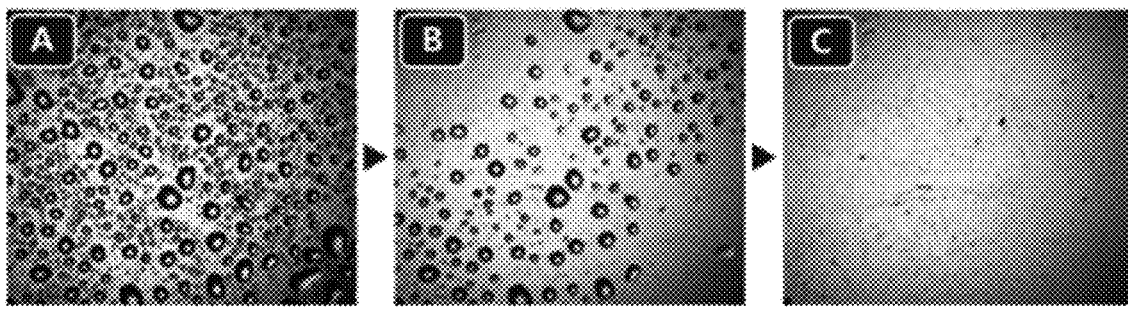

FIG. 8 is a perspective view illustrating schematically a self-cleaning device according to still another embodiment of the disclosure, FIG. 9 is a view illustrating an electrode layer according to still another embodiment of the disclosure, and FIG. 10 and FIG. 11 are views illustrating a process of removing droplets using the self-cleaning device in FIG. 8.

In FIG. 8, the self-cleaning device of the present embodiment is used for an industrial glass such as a glass of a vehicle or a construction glass, etc. The self-cleaning device may include an electrode layer 804 and a hydrophobic insulation layer 806 disposed sequentially on a solid material layer 802.

The solid material layer 802 may be a glass or a transparent plastic, etc.

The electrode layer (metal material layer or heating layer) 804 locates on the solid material layer 802 and evaporates droplets existed on the hydrophobic insulation layer 806 by generating heat when a power is applied thereto from an external device, thereby removing the droplets.

In an embodiment, the electrode layer 804 may include a view member 900 and a heating member 902.

Here, the view member 900 may be disposed at a position at which angle of view is secured and have a structure similar to the lens member 200 in FIG. 2, and the heating member 902 may have a structure similar to the heating member 202 in FIG. 2. Accordingly, any further description concerning the view member 900 and the heating member 902 will be omitted.

The hydrophobic insulation layer 806 is disposed on the electrode layer 804 and may include an insulation layer and a hydrophobic layer. That is, the insulation layer and the hydrophobic layer may locate sequentially on the electrode layer 804, and droplets exist on the hydrophobic layer.

Shortly, the self-cleaning device of the present embodiment may remove the droplets by generating heat using the electrode layer 804 as shown in A1 to A3 in FIG. 10. Particularly, the self-cleaning device may remove the droplets of a size higher than 3 $\mu\ell$ by slipping the droplets in the gravitational direction as shown in B1 in FIG. 10 and remove the droplets of less than 3 $\mu\ell$ by evaporating the droplets using the heat as shown in B2 in FIG. 10. Experimental result of removing the droplets is shown in FIG. 11.

Figure 12:
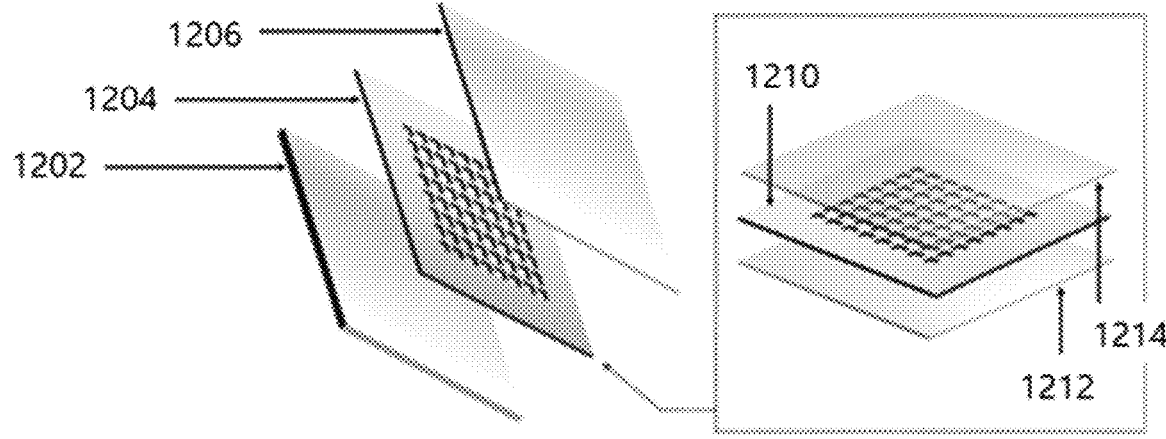
FIG. 12 is a perspective view illustrating a self-cleaning device according to still another embodiment of the disclosure.

FIG. 12 is a perspective view illustrating a self-cleaning device according to still another embodiment of the disclosure.

In FIG. 12, the self-cleaning device of the present embodiment may include multi-electrode layer 1204 and a hydrophobic insulation layer 1206 disposed sequentially on a solid material layer 1202. That is, the other elements except the multi-electrode layer 1204 are the same as in FIG. 8.

The multi-electrode layer 1204 may include a metal material layer 1210, a first conductive material layer 1212 disposed below the metal material layer 1210 and a second conductive material layer 1214 located on the metal material layer 1210. That is, the multi-electrode layer 1204 may include multiple electrode layers.

The metal material layer 1210, the first conductive material layer 1212 and the second conductive material layer 1214 have similar structure and function to the metal material layer 510, the first conductive material layer 512 and the second conductive material layer 514 in FIG. 5, and any further description concerning the similar elements will be omitted.

Briefly, the self-cleaning device of the present embodiment may enhance removal efficiency of droplet by disposing the conductive material layers 1212 and 1214 on and below the metal material layer 1210.

One power is applied to the electrode layer in above description, but plural powers may be applied to the electrode layer.

A time elapsed for reaching target temperature may be several tens of seconds to several minutes when a power is continuously applied to the electrode layer from a start time at which the self-cleaning device begins driving, so as to generate heat. Accordingly, multiple powers may be sequentially applied to increase rapidly up to the target temperature.

Figure 13:
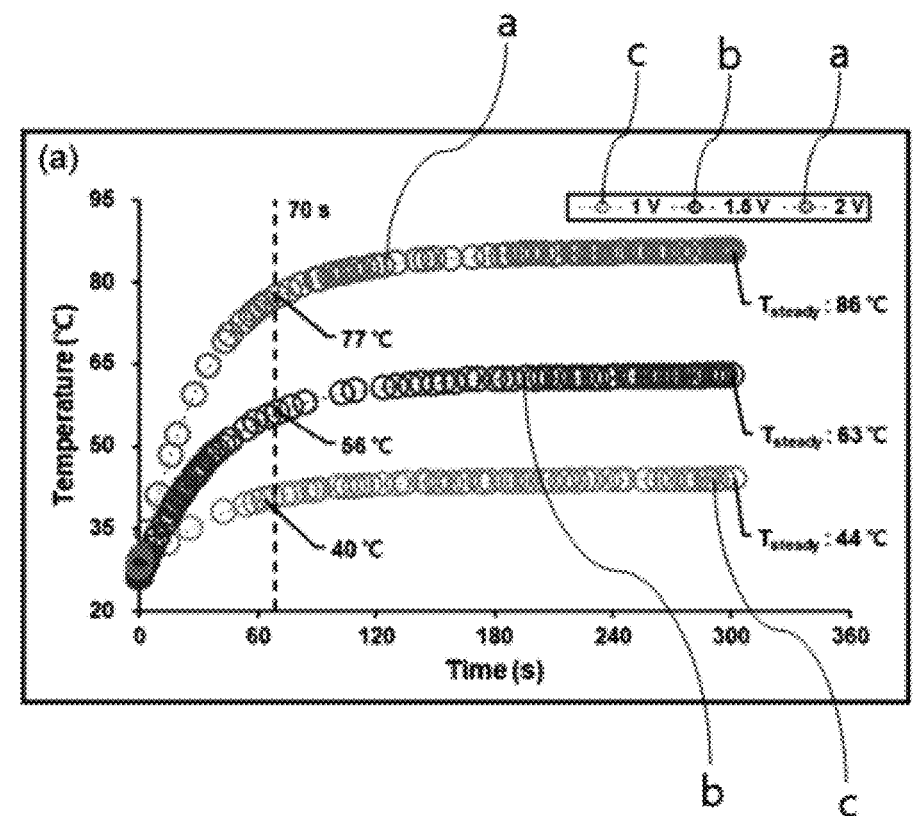
FIG. 13 is a view illustrating change of temperature of an electrode layer when a power is applied.
Figure 14:
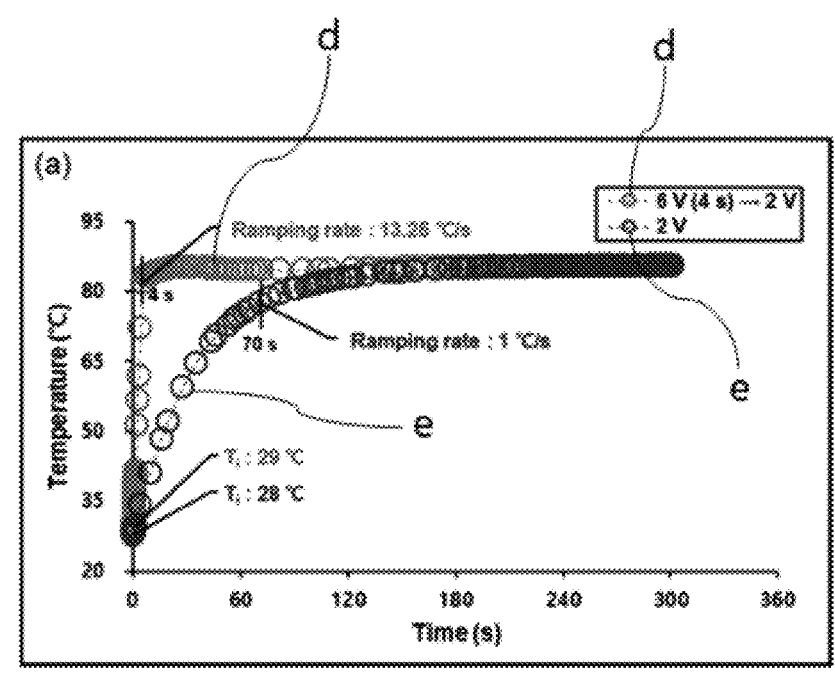
FIG. 14 to FIG. 15 are views illustrating change of temperature of a surface of a self-cleaning device according to an embodiment of the disclosure.
Figure 15:
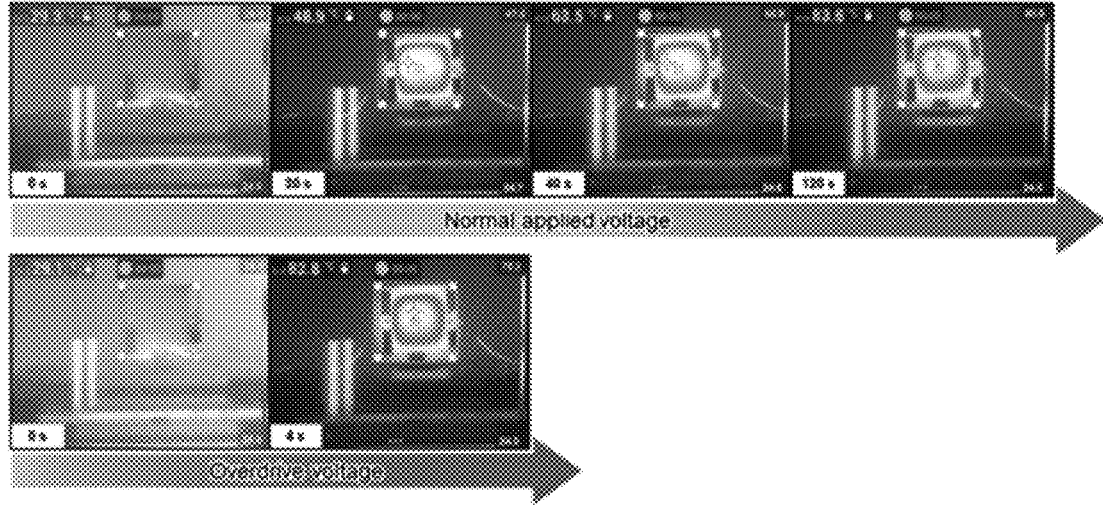

FIG. 13 is a view illustrating change of temperature of an electrode layer when a power is applied, and FIG. 14 to FIG. 15 are views illustrating change of temperature of a surface of a self-cleaning device according to an embodiment of the disclosure.

In FIG. 13, it is verified that a time elapsed for reaching specific temperature is inversely proportional to magnitude of corresponding voltage when different voltages, e.g., 1V, 1.5V and 2V are applied to an electrode layer (metal material layer or heating layer).

Accordingly, the self-cleaning device of the present embodiment may apply firstly relatively high voltage to reach rapidly target temperature and apply relatively small voltage to keep the target temperature after the self-cleaning device reaches the target temperature.

In an embodiment, the self-cleaning device may keep the target temperature by applying relatively small voltage to the heating member of the electrode layer after reaching rapidly the target temperature by applying relatively high voltage to the heating member.

In another embodiment, a pattern member may include sub pattern members to sense droplets. The self-cleaning device may keep the target temperature by applying relatively small voltage to the heating member after reaching rapidly the target temperature by applying relatively high voltage to the heating member, when powers are respectively to the sub pattern members and the heating member. In this time, alternating current voltage may be applied to the sub pattern members to sense the droplets and direct current voltage may be applied to the heating member.

As shown in FIG. 14, in the event that the target temperature is for example 80° C., approximately 120 seconds are required for reaching the target temperature when 2V is applied to the electrode layer, and about 4 seconds are required for reaching the target temperature when 6V is applied to the electrode layer. It is verified through an image showing change of temperature of the electrode layer that a time required for reaching the target temperature is inversely proportional to the voltage as shown in FIG. 15.

Accordingly, the self-cleaning device may apply for example 6V to the electrode layer at first so that it reaches rapidly the target temperature and apply continuously 2V to the electrode layer to keep the target temperate when it reaches the target temperature. That is, the self-cleaning device may increase rapidly temperature of its surface up to the target temperature by applying relatively high first voltage to the electrode layer, and keep the target temperature by applying a second voltage smaller than the first voltage to the electrode layer when the surface reaches the target temperature. As a result, the self-cleaning device may remove efficiently the droplets with improving a heating speed.

Figure 16:
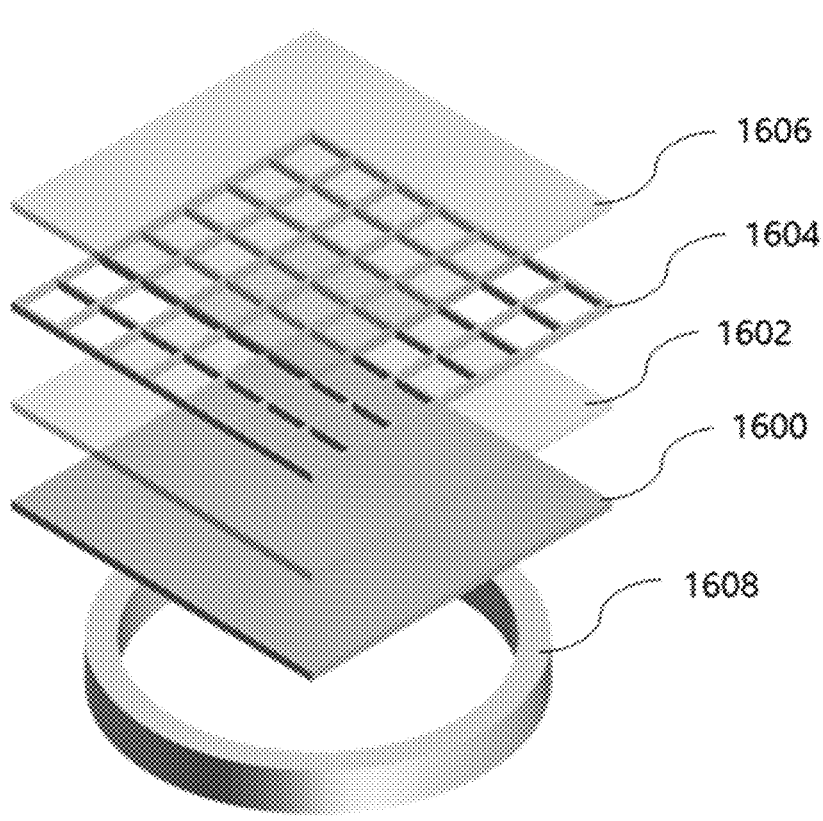
FIG. 16 is a perspective view illustrating schematically a self-cleaning device according to still another embodiment of the disclosure.
Figure 17:
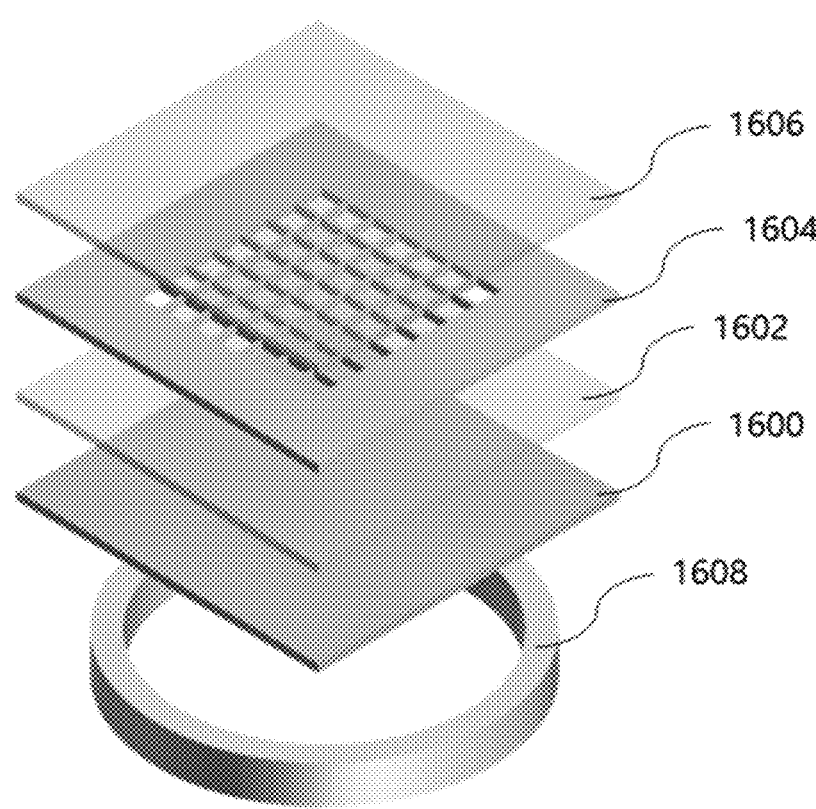
FIG. 17 is a perspective view illustrating schematically a self-cleaning device according to still another embodiment of the disclosure.
Figure 18:
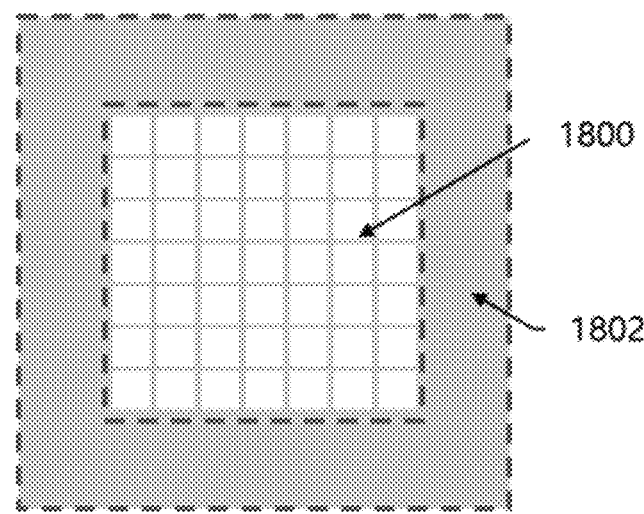
FIG. 18 is a view illustrating a structure of an electrode layer according to an embodiment of the disclosure.

FIG. 16 is a perspective view illustrating schematically a self-cleaning device according to still another embodiment of the disclosure, FIG. 17 is a perspective view illustrating schematically a self-cleaning device according to still another embodiment of the disclosure, FIG. 18 is a view illustrating a structure of an electrode layer according to an embodiment of the disclosure, and FIG. 19 to FIG. 26 are views illustrating a process of removing droplets, high viscosity liquid contaminant and mixed contaminant using the self-cleaning device in FIG. 16 or FIG. 17.

In FIG. 16, a self-cleaning device of the present embodiment may remove droplets, high viscosity liquid material (high viscosity liquid contaminant) or mixed material of liquid and solid (mixed contaminant) using electric resistance heat or mechanical vibration, and include a solid material layer 1600, an insulation layer 1602, an electrode layer 1604, a hydrophobic insulation layer 1606 and a mechanical vibration unit 1608. The self-cleaning device may further include a controller for controlling its elements. Here, the high viscosity may mean viscosity of above 10 cP.

In an embodiment, the solid material layer 1600, the insulation layer 1602, the electrode layer 1604 and the hydrophobic insulation layer 1606 are sequentially disposed, the mechanical vibration unit 1608 locates below the solid material layer 1600, and the droplets such as rainwater, etc. may be adhered to the hydrophobic insulation layer 1606. That is, the hydrophobic insulation layer 1606 is exposed outside and the droplets are adhered to the hydrophobic insulation layer 1606.

The solid material layer 1600 is a basic layer, e.g., a substrate.

The insulation layer 1602 is disposed on the solid material layer 1600 and may protect the mechanical vibration unit 1608 by preventing heat (electric resistance heat) generated from the electrode layer 1604 from being delivered to the mechanical vibration unit 1608. To perform this operation, the insulation layer 1602 may be formed of material with low thermal conductivity.

Performance of the mechanical vibration unit 1608 may be deteriorated as temperature of the mechanical vibration unit 1608 increases when the mechanical vibration unit 1608 is for example a sound wave generator. The performance of the mechanical vibration unit 1608 may 1608 may be deteriorated if heat generated from the electrode layer 1604 is delivered to the mechanical vibration unit 1608 when the heat is generated from the electrode layer 1604 to remove the droplets. Accordingly, the insulation layer 1602 may locate between the solid material layer 1600 and the electrode layer 1604 so that the heat generated from the electrode layer 1604 is not delivered to the mechanical vibration unit 1608.

The electrode layer (heating layer) 1604 may locate on the insulation layer 1602 and generate heat when a power is applied thereto from an outer device. Accordingly, the heat may reduce a volume and surface tension of the droplet on the hydrophobic insulation layer 1606. Especially, the electrode layer 1604 may change the droplet to have resonant volume.

Of course, small droplet (for example droplet of below 3 $\mu\ell$) may be removed by only the heat generated from the electrode layer 1604, but high droplet (for example droplet of a size higher than 3 $\mu\ell$) may be removed by using mechanical vibration generated by the mechanical vibration unit 1608 after reducing the volume of the droplet by using the heat generated from the electrode layer 1604. This will be described in detail below.

In an embodiment, the electrode layer 1604 may be embodied with a patterned structure as shown in FIG. 16 to pass smoothly a light. However, heating amount may be relatively small in the patterned structure.

To improve the heating amount, a part of the electrode layer 1604 may be patterned and conductive material may be coated on the other part of the electrode layer 1604 as shown in FIG. 17 and FIG. 18.

Particularly, the electrode layer 1604 may include a view member 1800 and a heating member 1802 as shown in FIG. 18.

The view member 1800 may locate at a position at which user's view is secured, for example locate at a central part of the electrode layer 1604. The user's view may not be properly secured if the view member 1800 is opaque. Accordingly, it is proper to form the view member 1800 to have the patterned structure, e.g., mesh structure with be formed of transparent material so that the light passes smoothly through the view member 1800. As a result, the view member 1800 may have excellent light transmittance with generating the heat.

The heating member 1802 may be electrically connected to the view member 1800 while it locates outside or inside the view member 1800, and conductive material may be coated on whole area of the heating member 1802. Preferably, the heating member 1802 may be formed of material with excellent heating efficiency and locate at a location not corresponding to a lens of a camera, e.g., outside the view member 1800.

Heat is generated from the heating member 1802 when a power is applied to the heating member 1802, and the generated heat may be delivered to the view member 1800. As a result, evaporation efficiency of droplet of the view member 1800 may increase. Of course, a power may be also applied to the view member 1800. That is, powers, e.g., direct current voltage may be applied to the view member 1800 and the heating member 1802, respectively.

The hydrophobic insulation layer 1606 locates on the electrode layer 1604 and may include for example an insulation layer and a hydrophobic layer. That is, the insulation layer and the hydrophobic layer may be sequentially disposed on the electrode layer 1604, and droplets may exist on the hydrophobic layer.

The mechanical vibration unit 1608 generates mechanical vibration, and may be a sound wave generator for generating single frequency sound or multi-frequency sound. A mechanical vibration unit having a doughnut shape may locate below the solid material layer 1600 or multiple mechanical vibration units may be disposed below the solid material layer 1600. That is, size, shape or number of the mechanical vibration unit 1608 is not limited as longs as the mechanical vibration unit 1608 generates the mechanical vibration.

Hereinafter, an operation of removing droplets using the self-cleaning device with the structure mentioned above will be described in detail.

Figure 19:
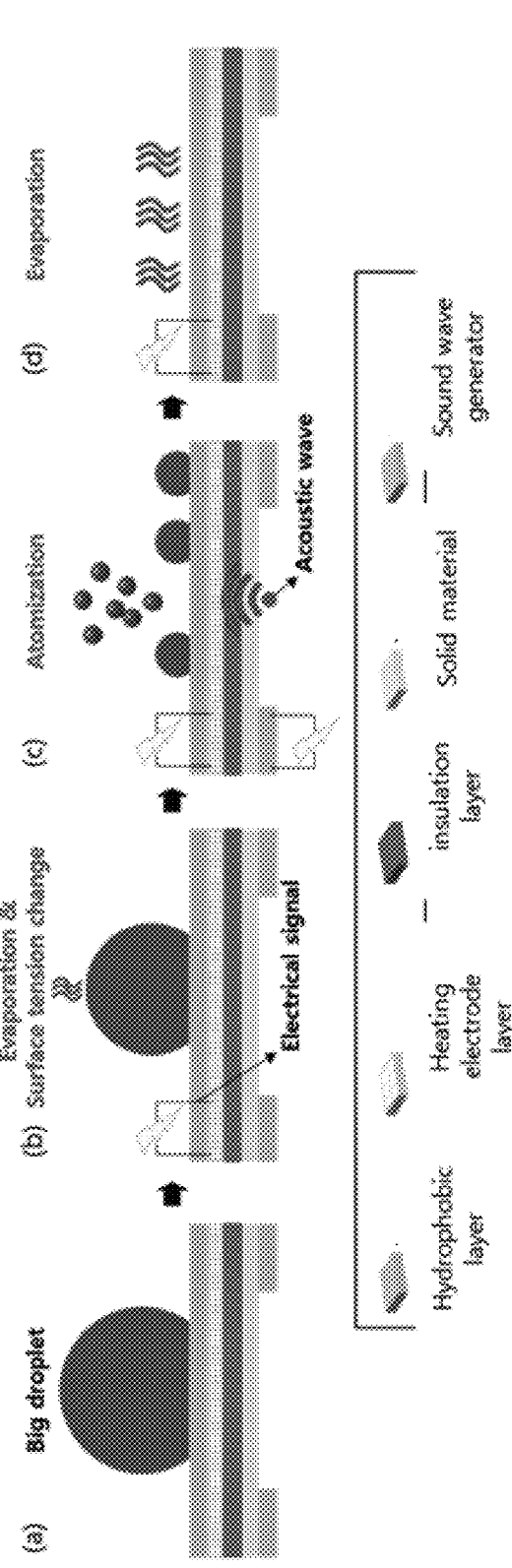

In an embodiment, the self-cleaning device may reduce a volume and surface tension of the droplet by applying an electrical signal to the electrode layer 1604 as shown in FIG. 19.

Subsequently, the self-cleaning device may stop the applying of the electrical signal and then generate the mechanical vibration. In this case, the droplet of which the volume reduces may be atomized as shown in (c) in FIG. 19. The atomization may be achieved when the volume of the droplet corresponds to a resonant frequency of a sound wave generated from the mechanical vibration unit 1608.

Another material, e.g., high viscosity liquid contaminant, etc. existed on a surface of the self-cleaning device as well as the droplet may be removed through the atomization. Of course, the droplet is removed through the atomization, but a part of the droplets may be also removed as it slipped from the surface of the self-cleaning device.

On the other hand, in the event that remaining droplet exists according as the droplets are not completely removed by the mechanical vibration, the self-cleaning device may generate heat by applying again an electrical signal to the electrode layer 1604, thereby evaporating the remaining droplet to remove the remaining droplet. The remaining droplet may be easily removed by using only the heat because the remaining droplet has small size. Here, intensity of the electrical signal applied before the mechanical vibration is generated may be identical to or be different from that of the electrical signal applied after the mechanical vibration is generated.

The self-cleaning device may detect the remaining droplet and then apply again the electrical signal, but it may apply always the electrical signal without detection of the remaining droplet after the mechanical vibration is applied to the droplet. That is, generation of the electric resistance heat, generation of the mechanical vibration and generation of additional electric resistance heat may be automatically performed in sequence.

Figure 20:
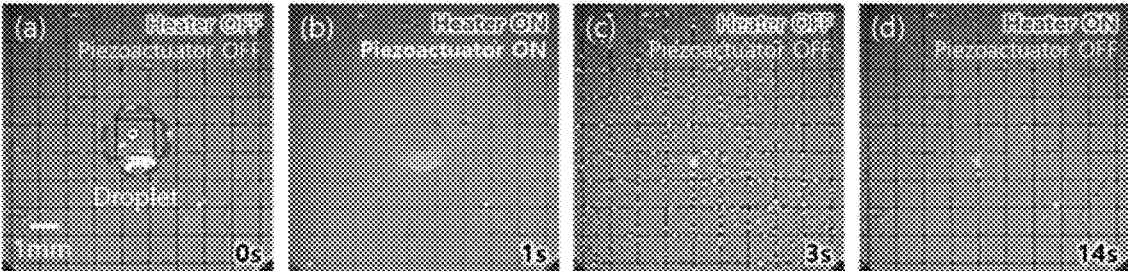

Referring to experimental result, the droplets may be atomized when the mechanical vibration generated by the mechanical vibration unit 1608 is applied to the droplets after the heat is applied to the droplets by using the electrode layer 1604, as shown in (b) in FIG. 20. Here, in the event that the remaining droplet exists, the self-cleaning device may remove the remaining droplet by generating the heat using the electrode layer 1604 as shown in (c) in FIG. 20.

Figure 21:
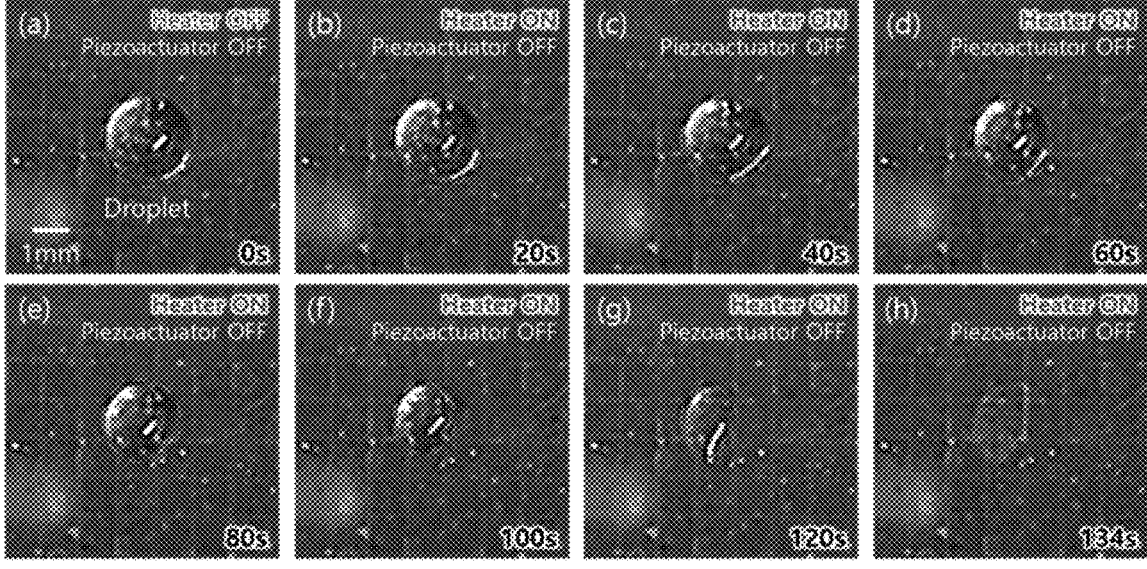
Figure 23:
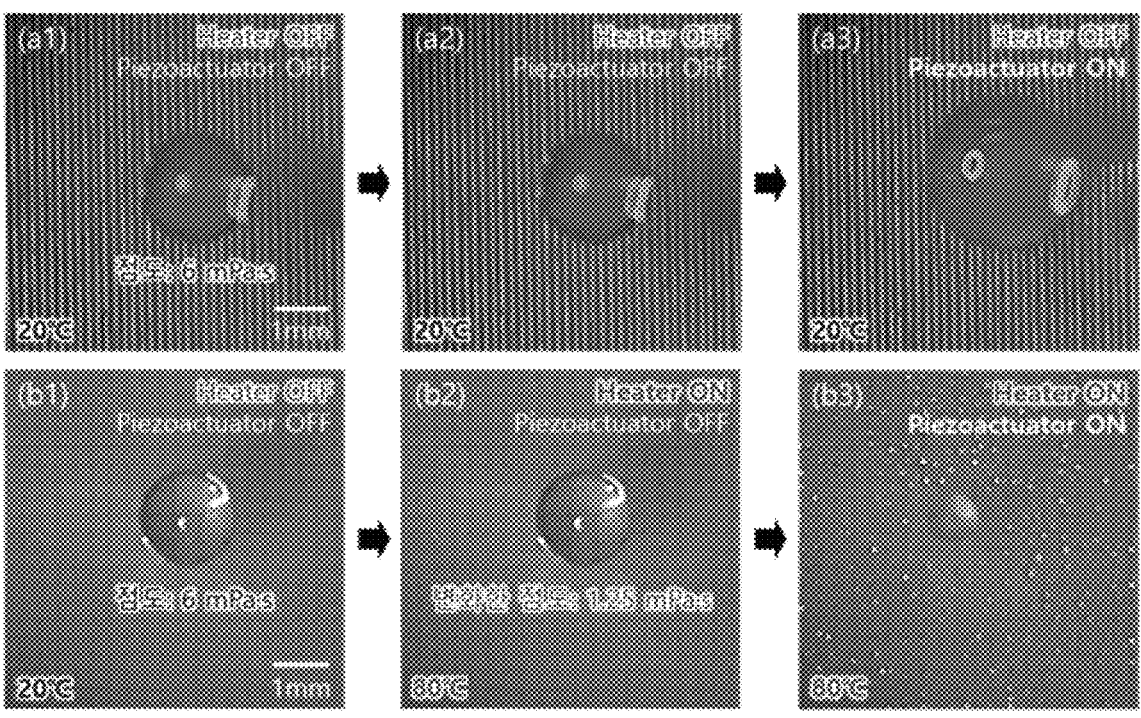

On the other hand, the self-cleaning device may remove the droplets by using only heat generated from the electrode layer 1604 without the mechanical vibration. The volume of the droplet reduces gradually as shown in FIG. 21 when the electrode layer 1604 generates the heat, and finally the droplet is removed. However, the droplets are removed in 14 seconds when the heat and the mechanical vibration are used, but the droplets are removed in 134 seconds when only the heat is used. Accordingly, it is efficient that the self-cleaning device provides the mechanical vibration to the droplets after applying the heat to the droplets.

This self-cleaning method may remove the high viscosity liquid contaminant as well as the droplet such as rainwater. Here, the high viscosity liquid contaminant may have viscosity higher than the rainwater.

Figure 22:
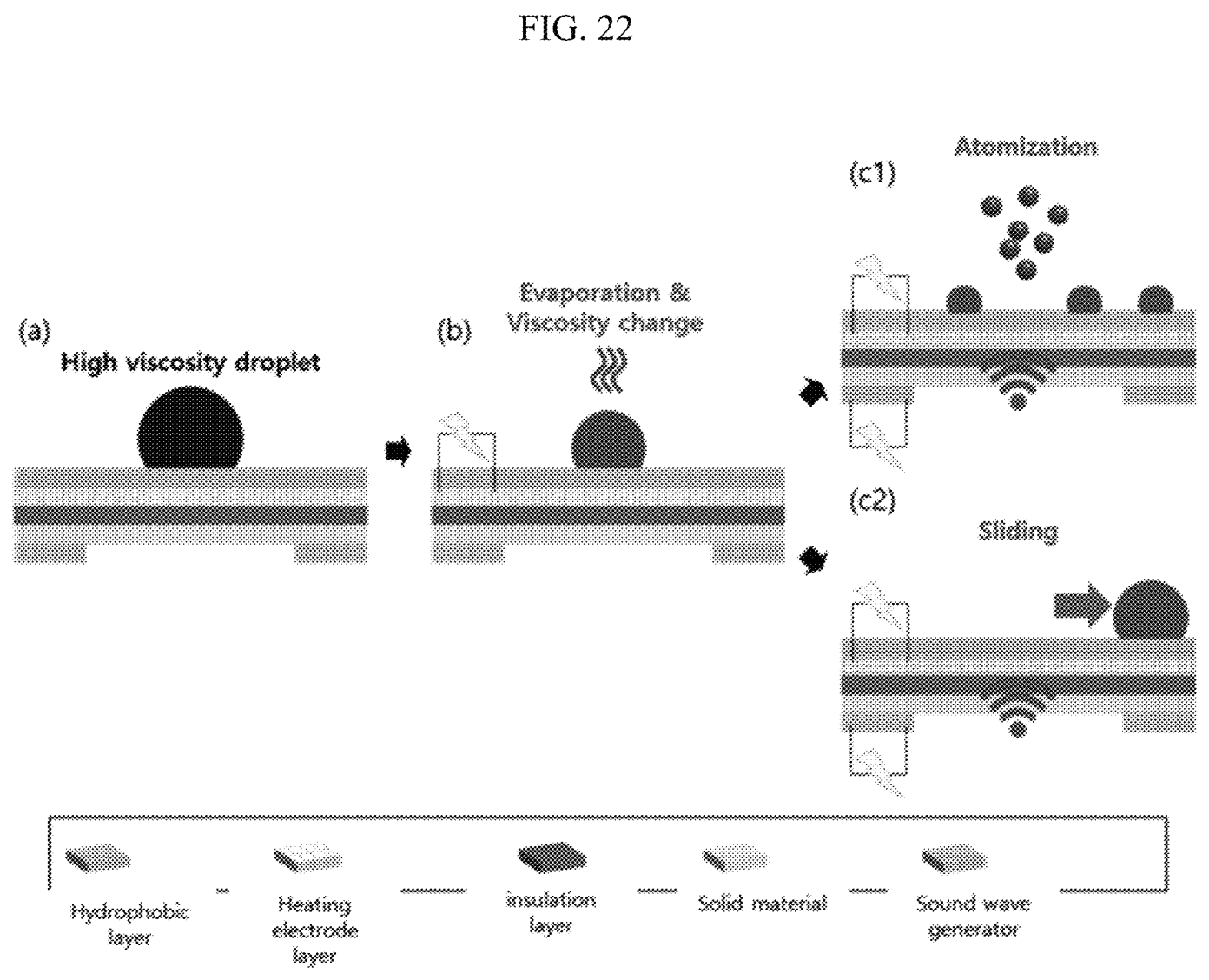

Atomization effect is low if only mechanical vibration is applied to the high viscosity liquid contaminant without applying heat because the high viscosity liquid contaminant has high viscosity. Accordingly, the self-cleaning device may atomize the high viscosity liquid contaminant by applying the mechanical vibration to the high viscosity liquid contaminant after reducing the viscosity of the high viscosity liquid contaminant by applying the heat to the high viscosity liquid contaminant using the electrode layer 1604 as shown in FIG. 22, thereby removing the high viscosity liquid contaminant.

That is, the self-cleaning device may atomize the high viscosity liquid contaminant after reducing the viscosity of the high viscosity liquid contaminant by applying the heat to remove the high viscosity liquid contaminant. The high viscosity liquid contaminant is temporarily transformed but is not removed as shown in (a) in FIG. 23 if only mechanical vibration is applied to the high viscosity liquid contaminant without providing the heat. However, it is verified that the high viscosity liquid contaminant is atomized and then removed as shown in (b) in FIG. 23 when the mechanical vibration is applied to the high viscosity liquid contaminant after providing the heat to the high viscosity liquid contaminant.

It is impossible to remove solid contaminant through evaporation using electric resistance heat, and it is difficult to remove mixed contaminant of solid and liquid (droplet) through the atomization using the mechanical vibration. That is, it is difficult to remove the mixed contaminant through only electric resistance heat or only mechanical vibration.

Figure 24:
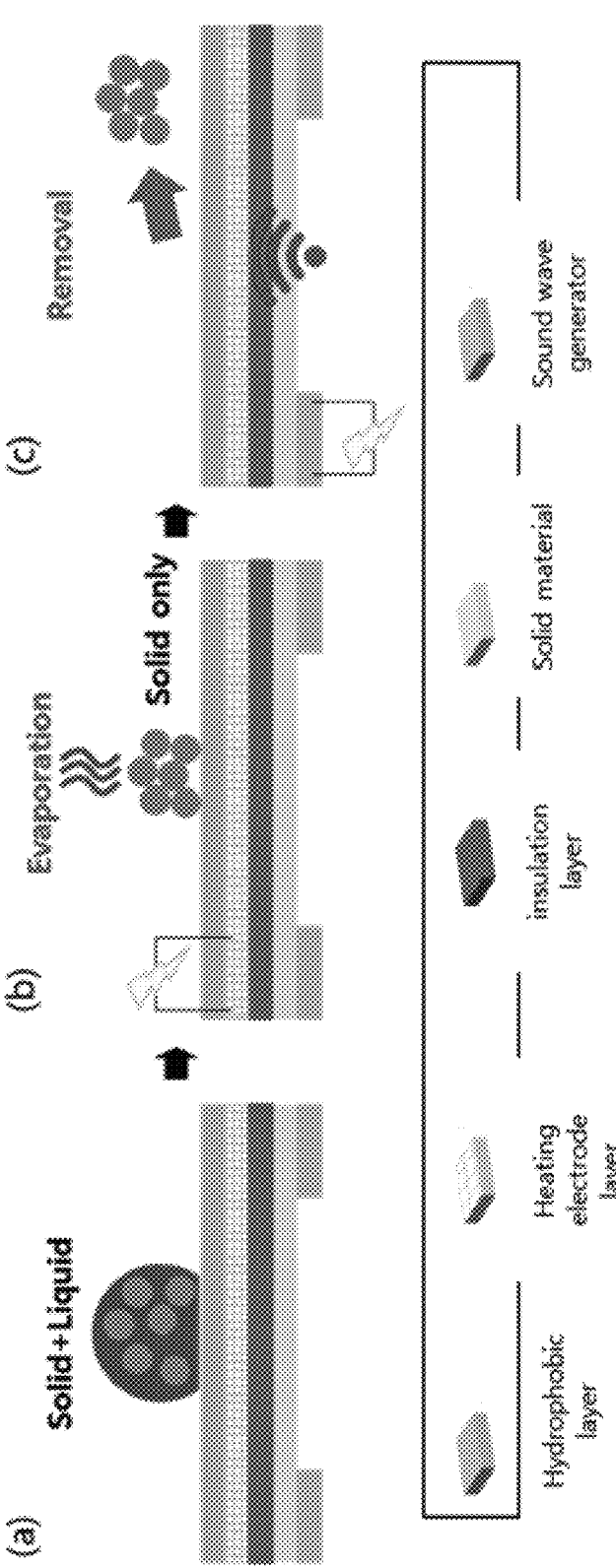

Whereas, the self-cleaning device may remain only solid contaminant by evaporating liquid of the mixed contaminant by applying heat generated from the electrode layer 1604 to the mixed contaminant and reduce gradually adhesion between the solid contaminant and the surface of the self-cleaning device by applying the mechanical vibration to the solid contaminant as shown in FIG. 24, and thus the solid contaminant may be removed as it is separated from the surface of the self-cleaning device. That is, the self-cleaning device may remove the mixed contaminant by applying sequentially the electric resistance heat and the mechanical vibration to the mixed contaminant.

Figure 25:
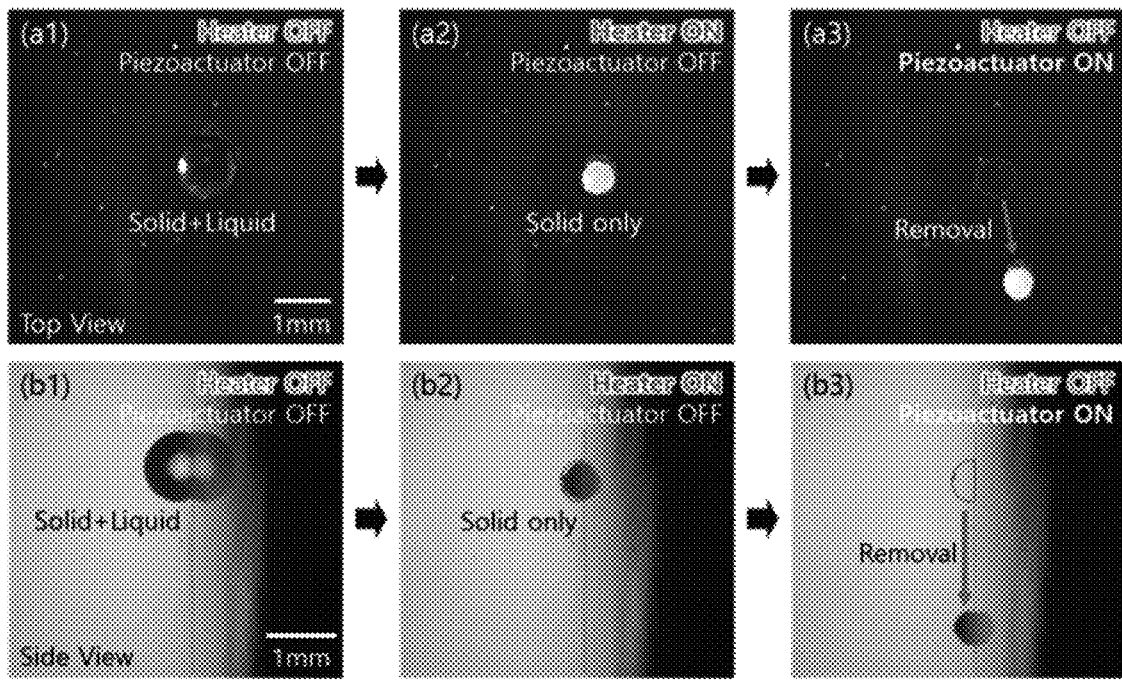

The solid contaminant is gathered in central part and its liquid is evaporated when the heat is applied to the mixed contaminant on the hydrophobic layer, and thus removal efficiency of the solid contaminant may be enhanced due to weight increasing of the solid contaminant and gravity. As shown in FIG. 25, it is verified that the mixed contaminant is well removed when the mechanical vibration is applied to the mixed contaminant after the electric resistance heat is provided to the mixed contaminant.

Figure 26:
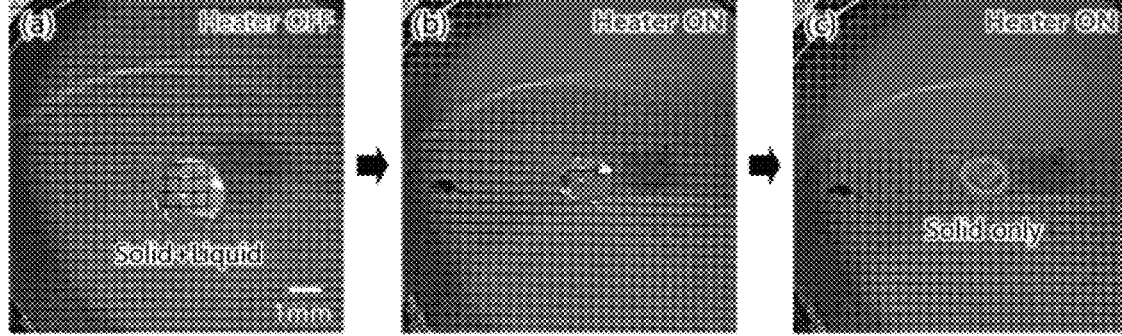

On the other hand, the solid contaminant is not gathered but is distributed in a circle type as shown in FIG. 26 when the heat is applied the solid contaminant on a general glass. As a result, the mixed contaminant may not be smoothly removed.

Shortly, the self-cleaning device may remove the droplets, the high viscosity liquid contaminant and the mixed contaminant of liquid and solid by using the electric resistance heat and the mechanical vibration. Here, a time during which the electric resistance heat is applied to the droplet, the high viscosity liquid contaminant or the mixed contaminant may differ. For example, a time during which the electric resistance heat is applied to the high viscosity liquid contaminant may be greater than that during which the electric resistance heat is applied to the droplet.

In another embodiment, the self-cleaning device may use selectively the electric resistance heat or the mechanical vibration depending on a situation.

For example, the self-cleaning device may sense kind, size of shape of the droplet using a sensing unit and use selectively the electric resistance heat or the mechanical vibration according to the sensed result.

For example, the self-cleaning device may sense that most of rainwaters has a size of above 3 $\mu\ell$ when the rain is falling in large drops and generate only the mechanical vibration without generating the electric resistance heat depending on the sensed result.

In another example, the self-cleaning device may sense that most of rainwaters has a size smaller than 3 $\mu\ell$ when the rain is falling in small drops and generate only the electric resistance heat without providing the mechanical vibration according to the sensed result.

In still another example, the self-cleaning device may generate together the electric resistance heat and the mechanical vibration. For example, the self-cleaning device may generate together the electric resistance heat and the mechanical vibration to remove rapidly the droplets.

In still another embodiment, in the event that multiple mechanical vibration units exist, the self-cleaning device may apply the mechanical vibration to droplets on its partial area by operating a part of the mechanical vibration units after reducing the volume of the droplets using the electric resistance heat. This method may be performed when the droplets are adhered to only the partial area.

Briefly, the self-cleaning device of the present embodiment may use the electric resistance heat for reducing the volume of the droplet and the mechanical vibration for vibrating the droplet in a vertical direction, and use selectively the electric resistance heat and the mechanical vibration depending on a situation. As a result, the droplets, the high viscosity liquid contaminant and the mixed contaminant may be effectively removed.

Especially, the self-cleaning device may remove every kind of liquid or solid contaminants adhered to its surface through strong shearing force due to rapid movement of triple phase boundary and flux generated inside or outside the droplet in the process of applying the electric resistance heat and the mechanical vibration.

A frequency is not mentioned in above description, but a frequency for the mechanical vibration may differ depending on a situation.

For example, a frequency of the mechanical vibration when the mechanical vibration is applied after the electric resistance heat is provided may differ from that when the electric resistance heat and the mechanical vibration are simultaneously generated.

Additionally, shape and number of the mechanical vibration unit 1608 may differ according to kind, size or shape of the droplet to be removed. The mechanical vibration unit 1608 may 1608 may generate single frequency sound or multi-frequency sound depending on a situation.

Furthermore, the electric resistance heat or the mechanical vibration may not have constant intensity but be changed over time.

Figure 27:
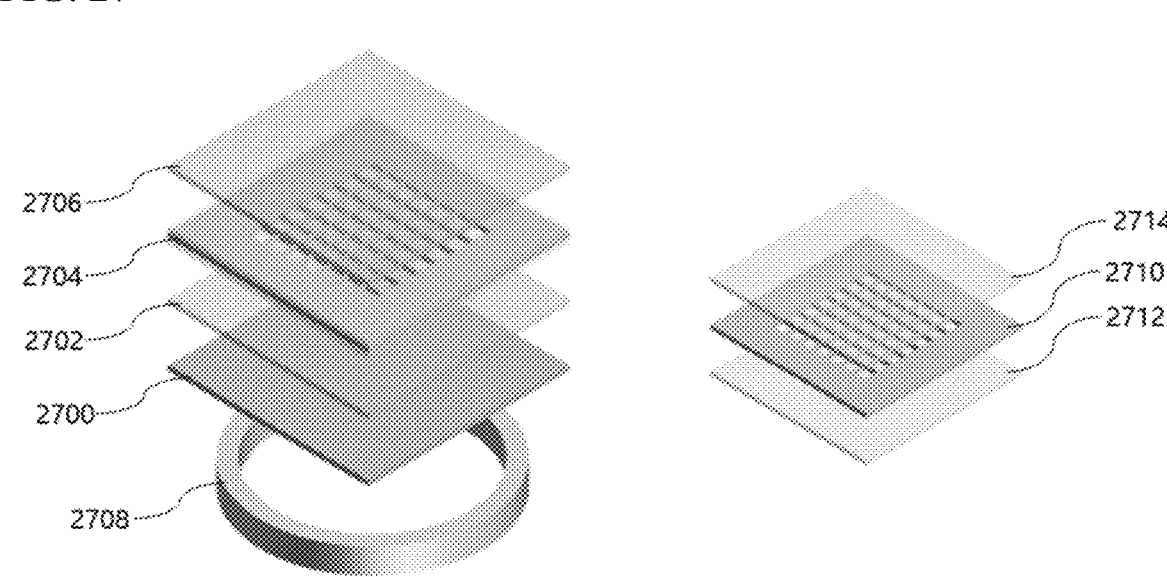
FIG. 27 is a perspective view illustrating a self-cleaning device according to still another embodiment of the disclosure.

FIG. 27 is a perspective view illustrating a self-cleaning device according to still another embodiment of the disclosure.

In FIG. 27, the self-cleaning device of the present embodiment may include a solid material layer 2700, an insulation layer 2702, a multi-electrode layer (multi-heating layer) 2704, a hydrophobic insulation layer 2706 and a mechanical vibration unit 2708. The other elements except the multi-electrode layer 2704 are the same as in FIG. 17.

The multi-electrode layer 2704 may include a metal material layer 2710, a first conductive material layer 2712 disposed below the metal material layer 2710 and a second conductive material layer 2714 disposed on the metal material layer 2710. That is, the multi-electrode layer 2704 may include plural electrode layers.

The metal material layer 2710 may have the same structure as the electrode layer 1604 in FIG. 18. That is, a patterned structure is formed at a central part of the metal material layer 2710 and conductive material may be coated on whole area of an outer part of the metal material layer 2710.

The first conductive material layer 2712 is electrically connected to the metal material layer 2710 while it locates below the metal material layer 2710.

The second conductive material layer 2714 is electrically connected to the metal material layer 2710 while it locates on the metal material layer 2710.

Especially, the conductive material layers 2712 and 2714 may have excellent transmittance because conductive material, e.g., metallic oxide such as ITO, etc. is coated on whole area of the conductive material layers 2712 and 2714. It is efficient that the metal material layer 2710 is formed of material with excellent heating feature because its transmittance is secured through the patterning of a central part of the metal material layer 2710.

Shortly, the self-cleaning device of the present embodiment may enhance removal efficiency of the droplets by disposing the conductive material layers 2712 and 2714 for delivering the heat below and on the metal material layer 2710.

Components in the embodiments described above can be easily understood from the perspective of processes. That is, each component can also be understood as an individual process. Likewise, processes in the embodiments described above can be easily understood from the perspective of components.

The embodiments of the invention described above are disclosed only for illustrative purposes. A person having ordinary skill in the art would be able to make various modifications, alterations, and additions without departing from the spirit and scope of the invention, but it is to be appreciated that such modifications, alterations, and additions are encompassed by the scope of claims set forth below.

What is claimed is:

1. A self-cleaning device comprising:
a metal material layer disposed on or above a substrate; and
a hydrophobic layer disposed on or above the metal material layer,
wherein the metal material layer includes a view member formed of conductive material and a heating member disposed outside or inside the view member, heat is generated from the view member and the heating member when a power is applied to the view member and the heating member, the heat generated from the heating member is delivered to the view member, and the heat generated from the heating member and delivered to the view member removes a droplet on a surface of the self-cleaning device, or reduces a volume or surface tension of the droplet.

2. The self-cleaning device of claim 1, wherein the view member is located at a central part of the metal material layer corresponding to a lens of a camera or at a location where field of view is secured, and conductive material is coated on an entire surface of the heating member,
and wherein the view member or the heating member is formed of metal, conductive material, metallic oxides, carbon material, polymer material or their mixture.

3. The self-cleaning device of claim 2, wherein direct current voltages are respectively applied to the view member and the heating member, and the view member and the heating member are electrically connected.

4. The self-cleaning device of claim 2, wherein a droplet of a size higher than 3 $\mu\ell$ existing on a surface of the self-cleaning device slides in a gravitational direction due to hydrophobic characteristics of the hydrophobic layer, and a droplet of less than 3 $\mu\ell$ is evaporated by heat generated from the metal material layer.

5. The self-cleaning device of claim 1, further comprising:
a first conductive material layer disposed below the metal material layer and connected electrically to the metal material layer; and
a second conductive material layer disposed on the metal material layer and connected electrically to the metal material layer,
wherein the first conductive material layer is disposed between the substrate and the metal material layer, the second conductive material layer locates between the metal material layer and the hydrophobic layer, the heat generated from the heating member is delivered to the view member through the conductive material layers, and conductive material is coated on at least one of the conductive material layers.

6. A self-cleaning device comprising:
a metal material layer disposed on or above a substrate; and
a hydrophobic layer disposed on or above the metal material layer,
wherein the metal material layer includes a view member formed of conductive material and a heating member disposed outside or inside the view member,
wherein the view member includes at least one first sub view member and one or more second sub view members that are electrically disconnected from each other, and the first sub view members and the second sub view members are arranged alternately,
wherein the view member is electrically separated from the heating member,
wherein a change of resistance or capacitance of the self-cleaning device occurs when a first power is applied to the at least one first sub view member and when a second power applied to the one or more second sub view members is sensed to determine whether a droplet exists on a surface of the self-cleaning device, and
wherein the heat generated from the metal material layer removes the droplet on the surface of the self-cleaning device or reduces a volume or surface tension of the droplet when the droplet exists on the surface of the self-cleaning device.

7. The self-cleaning device of claim 6, wherein the at least one first sub view member or the one or more second sub view members include rectangular patterned electrodes, and conductive material coated over an entire surface of the heating member.

8. The self-cleaning device of claim 6, further comprising:
a first insulation layer disposed on the metal material layer;
a first conductive material layer disposed on the first insulation layer and located below the hydrophobic layer;
a second insulation layer disposed below the metal material layer; and
a second conductive material layer disposed below the second insulation layer and located on the substrate, wherein the first conductive material layer and the second conductive material layer are electrically separated from the metal material layer.

9. A self-cleaning device comprising:
a substrate;
a metal material layer disposed on or above the substrate; and
a hydrophobic layer disposed on or above the metal material layer,
wherein heat is generated from the metal material layer when a power is applied to the metal material layer and the heat removes a droplet on a surface of the self-cleaning device, or reduces a volume or surface tension of the droplet, and
a second voltage smaller than a first voltage is applied to the metal material layer when a specific reference value is satisfied after the first voltage is applied to the metal material layer.

10. The self-cleaning device of claim 9, wherein the self-cleaning device increases temperature up to a target temperature by applying the first voltage to the metal material layer, and the self-cleaning device keeps the target temperature by applying continuously the second voltage to the metal material layer when the self-cleaning device reaches the target temperature.

11. The self-cleaning device of claim 9, further comprising:
a first conductive material layer disposed below the metal material layer; and
a second conductive material layer disposed on the metal material layer,
wherein the metal material layer includes a view member formed of conductive material and a heating member disposed outside or inside the view member, the first conductive material layer locates between the substrate and the metal material layer, the second conductive material layer is disposed between the metal material layer and the hydrophobic layer, heat generated from the heating member is delivered to the view member through the conductive material layers, and conductive material is coated over an entire surface of at least one of the conductive material layers.

12. The self-cleaning device of claim 11, wherein the view member includes at least one first sub view member and one or more second sub view members that are electrically disconnected from each other, the first sub view member and the second sub view members are arranged alternately, the view member is electrically separated from the heating member, and
a change of resistance or capacitance of the self-cleaning device occurs when a first power is applied to the first sub view member and when a second power is applied to the second sub view members is sensed, and the droplet on a surface of the self-cleaning device is detected through the sensed result.

13. The self-cleaning device of claim 9, further comprising:
a first insulation layer disposed on the metal material layer;
a first conductive material layer disposed on the first insulation layer and located below the hydrophobic layer;
a second insulation layer disposed below the metal material layer; and
a second conductive material layer disposed below the second insulation layer and located on the substrate, wherein the first conductive material layer and the second conductive material layer are electrically separated from the metal material layer.

14. A self-cleaning device comprising:

an insulation layer disposed on or above a substrate;

an electrode layer disposed on or above the insulation layer; and a hydrophobic layer disposed on or above the electrode layer, wherein heat is generated from the electrode layer when an electrical signal is provided to the electrode layer, a volume or surface tension of an existing droplet on the hydrophobic layer is reduced by the generated heat, and the insulation layer reduces the heat generated from the electrode layer from being delivered toward the substrate.

15. The self-cleaning device of claim 14, further comprising:

a mechanical vibration unit disposed below the substrate and configured to generate single frequency sound or multi-frequency sound, wherein the mechanical vibration unit atomizes the droplet by applying mechanical vibration to the droplet of which the volume or the surface tension reduces to remove the droplet, and the insulation layer reduces the heat generated from the electrode layer from being delivered to the mechanical vibration unit.

16. The self-cleaning device of claim 15, wherein, if the droplet remains after the mechanical vibration is applied to the droplet, the remaining droplet is removed by generating the heat from the electrode layer again.

17. The self-cleaning device of claim 15, wherein the self-cleaning device is configured to remove high viscosity liquid material, and wherein the high viscosity liquid material has a viscosity of above 10 cP, the viscosity of the high viscosity liquid material decreases by electric resistance heat generated from the electrode layer, and the high viscosity liquid material of which the viscosity is reduced is atomized by mechanical vibration generated from the mechanical vibration unit to remove the high viscosity liquid material.

18. The self-cleaning device of claim 17, wherein a time during which electric resistance heat is applied when the high viscosity liquid material is removed differs from a time during which electric resistance heat is applied when the droplet is removed.

19. The self-cleaning device of claim 15, wherein the self-cleaning device is configured to remove a mixed material of solid and liquid, and wherein the liquid of the mixed material is evaporated by the electric resistance heat generated from the electrode layer, and the solid of the mixed material is separated from a surface of the self-cleaning device by the mechanical vibration generated from the mechanical vibration unit to remove the solid.

20. The self-cleaning device of claim 14, wherein the electrode layer includes a metal material layer, and wherein the metal material layer includes a view member where a specific pattern is formed by coating conductive material on a part of the metal material layer and a heating member disposed outside or inside the view member, heat is generated from the view member and the heating member according as a power is applied to one or more of the view member and the heating member, heat generated from the heating member is delivered to the view member, and a volume of the droplet reduces by the heat generated from the view member and the heat delivered from the heating member.

21. The self-cleaning device of claim 20, further comprising:

a first conductive material layer disposed below the metal material layer; and a second conductive material layer disposed on the metal material layer, wherein the first conductive material layer is disposed between the insulation layer and the metal material layer, the second conductive material layer is disposed between the metal material layer and the hydrophobic layer, the heat generated from the heating member is delivered to the view member through the conductive material layers, and conductive material is coated over an entire surface of one or more of the conductive material layers.

22. The self-cleaning device of claim 20, wherein the self-cleaning device increases a temperature up to a target temperature by applying a first voltage to the metal material layer and keeps the target temperature by applying continuously a second voltage to the metal material layer when the self-cleaning device reaches the target temperature, and wherein the first voltage is higher than the second voltage.

23. A self-cleaning device comprising:

a heating member disposed on or above a substrate;

a hydrophobic layer disposed on or above the heating member; and a mechanical vibration unit disposed below the substrate and configured to generate single frequency sound or multi-frequency sound, wherein a viscosity of high viscosity liquid contaminant on the hydrophobic layer decreases by heat generated from the heating member, the high viscosity liquid contaminant of which the viscosity decreases is atomized by mechanical vibration generated by the mechanical vibration unit, and the high viscosity liquid contaminant has the viscosity of above 10 cP.

24. The self-cleaning device of claim 23, further comprising:

an insulation layer disposed between the substrate and the heating member, wherein the insulation layer reduces the heat generated from the heating member from being delivered to the mechanical vibration unit.

25. A self-cleaning device comprising:

a heating layer disposed on or above a substrate;

a hydrophobic layer disposed on or above the heating layer; and a mechanical vibration unit disposed below the substrate and configured to generate single frequency sound or multi-frequency sound, wherein liquid contaminant of a mixed contaminant including solid contaminant and the solid contaminant existing on the hydrophobic layer is evaporated by heat generated from the heating layer, and the solid contaminant of the mixed contaminant is separated from a surface of the self-cleaning device by mechanical vibration generated from the mechanical vibration unit after the heat is generated to being removed.

26. The self-cleaning device of claim 25, further comprising:

an insulation layer disposed between the substrate and the heating layer, wherein the insulation layer reduces the heat generated from the heating layer from being delivered to the mechanical vibration unit.

* * * * *